United States Patent
Thach

(10) Patent No.: US 8,649,325 B2
(45) Date of Patent: Feb. 11, 2014

(54) COMMUNICATION SYSTEM, COMMUNICATION PROGRAM, COMMUNICATION APPARATUS, MOBILE TERMINAL AND, COMMUNICATION METHOD

(75) Inventor: David Thach, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 270 days.

(21) Appl. No.: 13/137,217

(22) Filed: Jul. 28, 2011

(65) Prior Publication Data

US 2012/0307722 A1    Dec. 6, 2012

(30) Foreign Application Priority Data

Jun. 3, 2011    (JP) .................. 2011-125837

(51) Int. Cl.
*H04W 4/00* (2009.01)
*H04J 1/10* (2006.01)
*H04B 1/38* (2006.01)

(52) U.S. Cl.
USPC ............................ 370/328; 370/315; 455/547

(58) Field of Classification Search
None
See application file for complete search history.

(56) References Cited

U.S. PATENT DOCUMENTS

2006/0200543 A1    9/2006 Kong et al.
2008/0117884 A1    5/2008 Ishii et al.

FOREIGN PATENT DOCUMENTS

| JP | 2006-129019 | 5/2006 |
|----|-------------|--------|
| JP | 2006-197536 | 7/2006 |
| JP | 2008-153773 | 7/2008 |
| JP | 2008-529443 | 7/2008 |
| WO | 2006/093392 | 9/2006 |

*Primary Examiner* — Yemane Mesfin
*Assistant Examiner* — Samina Choudhry
(74) *Attorney, Agent, or Firm* — Staas & Halsey LLP

(57) ABSTRACT

A communication apparatus internally generates a virtual terminal (emulator) of a mobile terminal. The virtual terminal performs handover to a 3G network in place of the mobile terminal. In the event of an incoming call to the mobile terminal, the virtual terminal receives the call in place of the mobile terminal and notifies the mobile terminal of the call. Consequently, without having to perform handover, the mobile terminal is able to receive communication notification, whereby telephone communication by the mobile terminal remains enabled without the expenditure of power for handover, enabling a reduction in power consumption.

1 Claim, 19 Drawing Sheets

FIG.5

| ENTRY | SIM NUMBER | MAC ADDRESS | IP ADDRESS | MODEL INFORMATION |
|---|---|---|---|---|
| ENTRY#1 | 8200500000000134 | 3E:A9:10:00:6F:78 | 10.120.22.10 | F801i |
| ENTRY#2 | 8832007800060453 | F0:A4:DE:4C:11:03 | 10.120.22.11 | F803i |
| ... | ... | ... | ... | ... |

| MODEL INFORMATION | CORRESPONDING OS | CORRESPONDING APPLICATION |
|---|---|---|
| F801i | OS1 | A1 |
| F803i | OS2 | A1,A2 |
| ⋮ | ⋮ | ⋮ |

102b

COMMUNICATION SYSTEM, COMMUNICATION PROGRAM, COMMUNICATION APPARATUS, MOBILE TERMINAL AND, COMMUNICATION METHOD

CROSS REFERENCE TO RELATED APPLICATIONS

This application is based upon and claims the benefit of priority of the prior Japanese Patent Application No. 2011-125837, filed on Jun. 3, 2011, the entire contents of which are incorporated herein by reference.

FIELD

The embodiments discussed herein are related to a communication system, a communication program, a communication apparatus, a mobile terminal, and a communication method.

BACKGROUND

Recently in the field of mobile terminals, reducing power consumption is being addressed from the perspective of extending battery life. For instance, the power consumed when a mobile terminal connects to the Internet varies according to the means of connection.

For example, communication schemes include those connecting to the Internet via a 3rd Generation (3G) antenna used for communication with 3G networks, as well as those connecting to the Internet via a wireless fidelity (Wifi) antenna used in Wifi communication. In comparing the two types of schemes, connecting to the Internet via a Wifi antenna consumes less power (see, for example, Japanese Laid-open Patent Publication Nos. 2008-529443, 2006-129019, 2006-197536).

Therefore, whenever possible, if a mobile terminal uses a Wifi antenna to connect to the Internet, power consumption by the mobile terminal can be reduced.

Conventionally, such technology for reducing power consumption involves preparing, onboard a vehicle (e.g., an automobile, a train, and a boat), a Wifi antenna communicable with the Wifi antenna of a mobile terminal, i.e., preparing an access point (see, for example, Japanese Laid-open Patent Publication No. 2008-153773).

Nevertheless with the technologies above, since telephone communication via the 3G antenna remains possible, the mobile terminal performs handover to maintain telephone communication quality with the 3G network, however, the mobile terminal also consumes power to perform handover. On the other hand, if the mobile terminal disables handover to reduce power consumption, the possibility that the mobile terminal cannot perform telephone communication increases.

In one aspect, an object of the present invention is to provide a communication system, a communication program, a communication apparatus, a mobile terminal, and a communication method to which the continuity of telephone communication by the mobile terminal is given consideration.

SUMMARY

According to an aspect of an embodiment, a communication system performs communication between a mobile terminal and a communication apparatus that are onboard a vehicle. The mobile terminal includes a first communication unit that communicates with a base station on a mobile communications network, a second communication unit that communicates with communication apparatus, a determining unit that determines whether connection with the communication apparatus has been established by the second communication unit, and a switching unit that suspends power supply to the first communication unit, if the determining unit determines that that connection by the second communication unit is established. The communication apparatus includes a third communication unit that communicates with the base station on the mobile communications network, a fourth communication unit that communicates with the mobile terminal and performs data communication with the third communication unit, and a control unit that controls an alternative communication unit that implements a communication function of the mobile terminal that communicates with the base station on the mobile communications network. The alternative communication unit controlled by the control unit includes a first data processing unit that causes the third communication unit to detect the base station on a communications network of the communication apparatus, to receive data from the detected base station, and to transfer the received data to the fourth communication unit; and a second data processing unit that if the data received from the mobile terminal by the fourth communication unit is transferred to the third communication unit, causes the third communication unit to detect the base station on the communication network of the communication apparatus and to transmit the transferred data to the detected base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram of the contents of an entry table 102a stored in a storage device 102 of the communication apparatus 100.

FIG. 6 is a diagram of the contents of a database 102b stored in the storage device 102 of the communication apparatus 100.

DESCRIPTION OF EMBODIMENTS

Preferred embodiments of the present invention will be explained with reference to the accompanying drawings.

In the present embodiment, despite being in transit onboard a vehicle (e.g., an automobile, a train, a boat, an airplane), the mobile terminal does not allow direct handover to a radio communications network outside the vehicle, instead the communication apparatus, which is onboard the vehicle, connects to the radio communications network and the communication apparatus onboard the vehicle connects directly to the mobile terminal via a radio communications network (e.g., a wireless LAN).

Thus, the handover to the radio communications network performed by the mobile terminal onboard the vehicle is assumed by the communication apparatus onboard the vehicle. For example, by emulation, the communication apparatus virtually executes the mobile terminal handover. Accordingly, the mobile terminal user is able to use the radio communications network as usual for communication/telephone communication and at the same time, the power consumed by the mobile terminal can be reduced by the amount that would have been consumed for handover.

Figure 1:
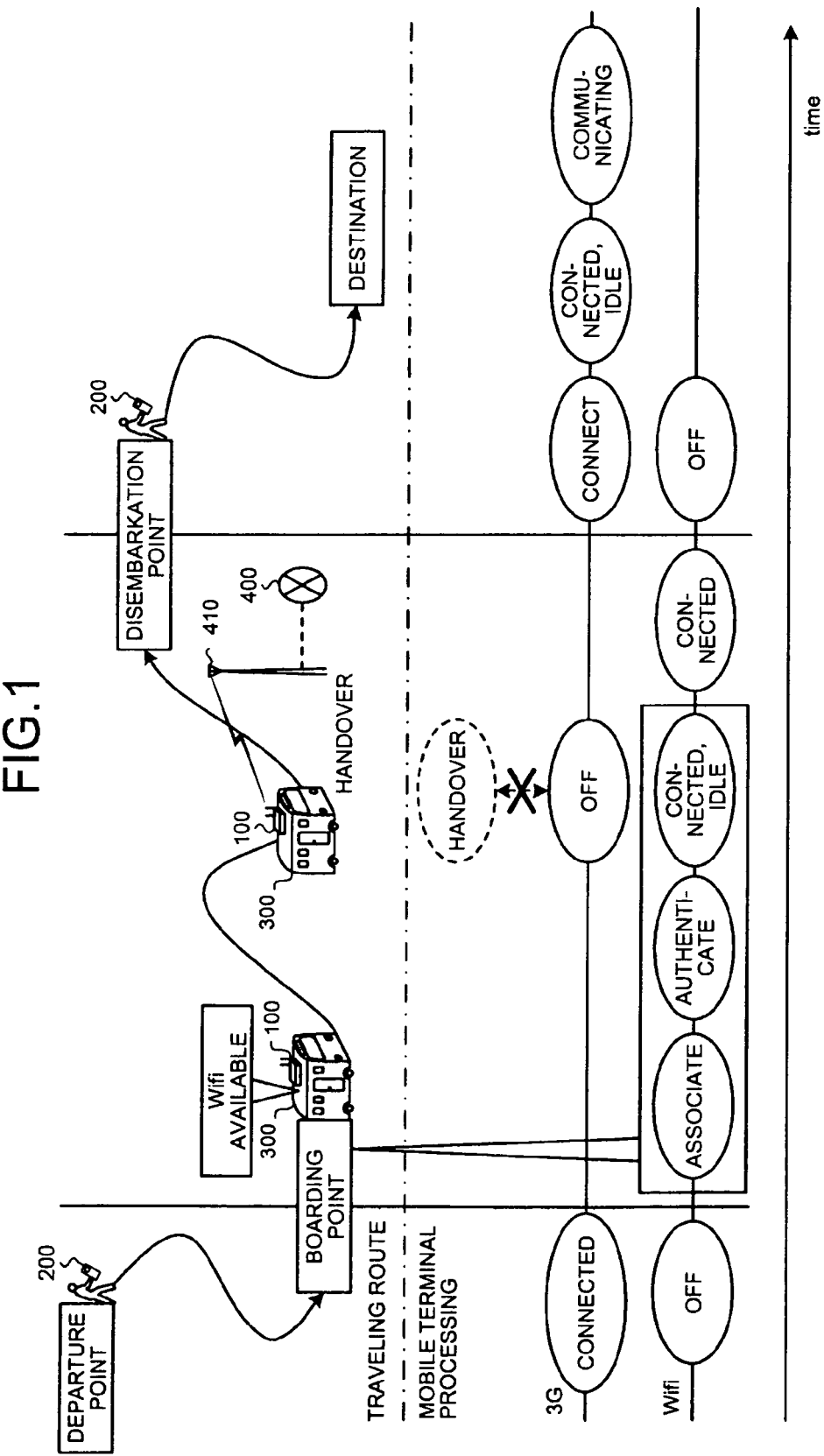
FIG. 1 is a diagram of an example of communication establishment by a mobile terminal according to the present embodiment.

FIG. 1 is a diagram of an example of communication establishment by the mobile terminal according to the present embodiment. In FIG. 1, an example is depicted where the user of a mobile terminal 200 travels on foot from an arbitrary departure point to a boarding point; travels onboard a vehicle 300 having a communication device 100 equipped with a Wifi communications device 120, from the boarding point to a disembarkation point; and travels on foot from the disembarkation point to a destination.

In this example, the communication apparatus 100 is an onboard device equipped on the vehicle 300. Examples of the vehicle 300 include automobiles, motorcycles, bicycles, buses, taxicabs, trains, ships, and airplanes. The communication apparatus 100 connects to a radio communications network (external radio communications network) external to the vehicle 300 and further connects to the mobile terminal 200 through a radio communications network onboard the vehicle 300 (internal radio communications network).

The external radio communications network is, for example, a mobile communications network including a 3 G communication scheme such as Wideband-Code Division Multiple Access (W-CDMA), Worldwide Interoperability for Microwave Access (WiMAX), etc. or a subsequent generation communication scheme. The mobile terminal 200 is capable of bidirectional telephone communication and data communication via the external radio communications network. In the present embodiment, an example will be described in which a 3G network 400 is used as the external radio communications network.

On the other hand, the internal radio communications network is, for example, a wireless LAN spot provided onboard the vehicle 300. The internal radio communications network is, for example, a network that consumes less power than the external radio communications network, but the external radio communications network has more base stations than that of the internal radio communications network. In the present embodiment, description is given using Wifi as an example.

In FIG. 1, during travel from the departure point to the boarding point, the mobile terminal 200 is connected to the 3G network 400 by a 3 G communications device of the mobile terminal 200 and the Wifi communications device of the mobile terminal 200 is disabled (for example, the Wifi communications device is powered off). Conventionally, between the departure point and the boarding point, power is consumed to perform the scanning process by the Wifi communications device of the mobile terminal 200, but as described above, the mobile terminal 200 does not perform the scanning process of the Wifi communications device, thereby reducing power consumption.

Next, at the boarding point, the mobile terminal 200 uses a radio frequency identification (RFID) communications device to transmit to the communication apparatus 100 of the vehicle 300, information necessary for Wifi communication and associates the Wifi communication between communication apparatus 100 and the mobile terminal 200. Subsequently, the mobile terminal 200 receives authentication for the mobile terminal 200 from the communication apparatus 100, establishes Wifi communication and enters a state of idle connection.

From the boarding point to the disembarkation point, the mobile terminal 200 connects to the Internet via the Wifi communications device and the 3 G communications device is in a disabled state (a state where neither Internet connection nor telephone communication is possible) (for example, the 3 G communications device is powered off). Handover during this time is performed by the communication apparatus 100 in place of the mobile terminal 200.

Thus, the mobile terminal 200, without having to repeatedly perform handover, reduces power consumption. Further, upon performing telephone communication, the mobile terminal 200 is able to do so by relay via the communication apparatus 100. At disembarkation, the mobile terminal 200 requests base station information from the communication apparatus 100, enabling reactivation of the 3 G communications device to be in a communicable state. Furthermore, upon performing telephone communication, the mobile terminal 200 requests base station information from the communication apparatus 100, enabling activation of the 3 G communications device and telephone communication having good quality.

At the disembarkation point, the mobile terminal 200 drops the connection with the Wifi communications device of the communication apparatus 100. From the disembarkation point to the destination, without performing the scanning process by the Wifi communications device of the mobile terminal 200, the mobile terminal 200 connects to base station 410 via the 3 G communications device, enters a state of idle connection, and communicates with the 3G network 400.

Conventionally, between the disembarkation point and the destination, power is consumed to perform the scanning process by the Wifi communications device of the mobile terminal 200, but as described above, the mobile terminal 200 does not perform the scanning process of the Wifi communications device, thereby reducing power consumption.

In this manner, the mobile terminal 200 according to the present embodiment can conserve the power that would have been used for scanning by the Wifi communications device of the mobile terminal 200 as well as conserve the power that would have been consumed for handover.

Next, an example of a communication system that is configured between the boarding point and the disembarkation point depicted in FIG. 1 and includes the mobile terminal 200 and the communication apparatus 100 onboard the vehicle 300, will be described using FIG. 2.

Figure 2:
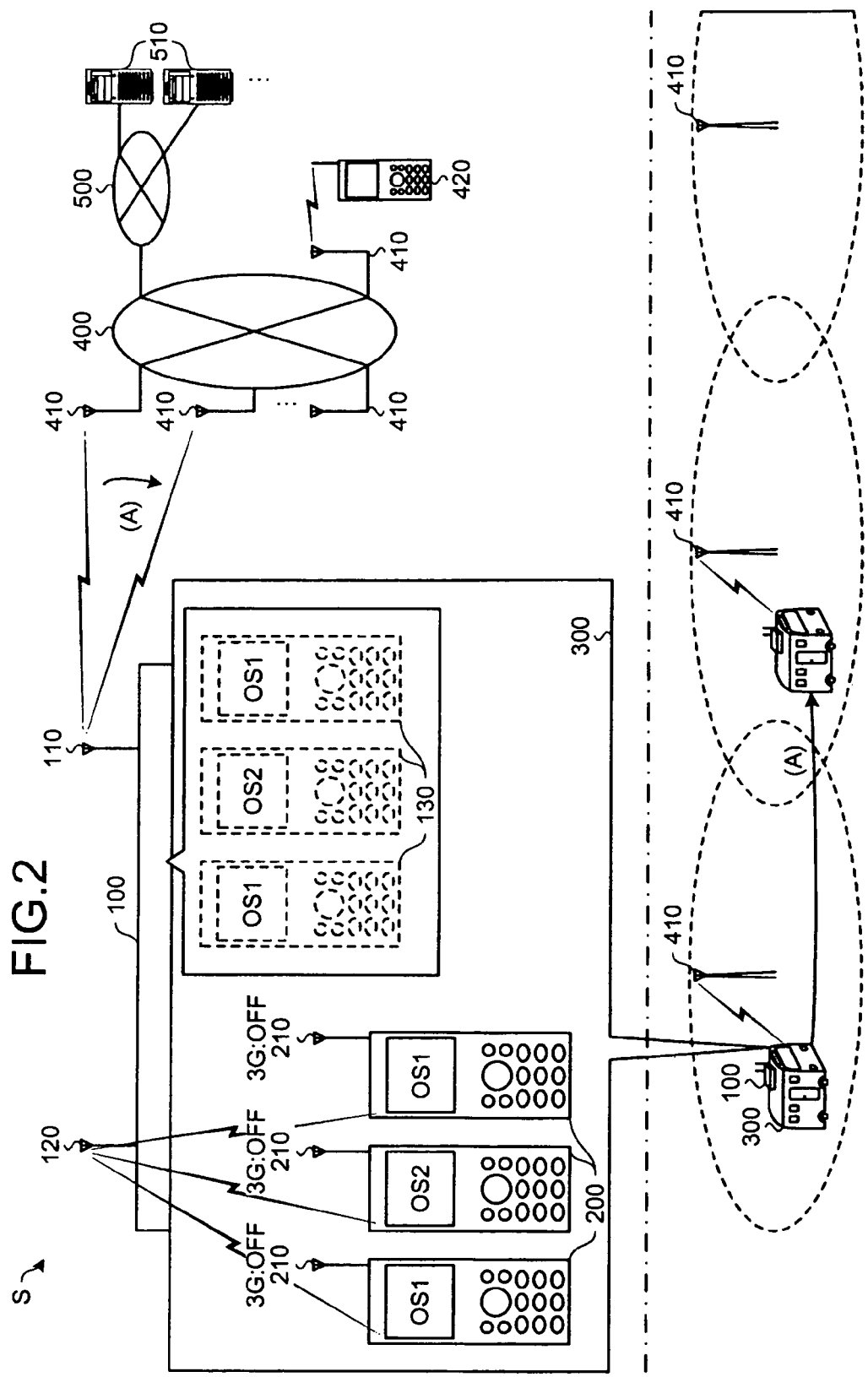
FIG. 2 is a diagram of one example of a communication system according to the present embodiment.

FIG. 2 is a diagram of one example of a communication system according to the present embodiment. In FIG. 2, a communication system S includes the mobile terminal 200 onboard the vehicle 300 and the communication apparatus 100 onboard the vehicle.

The communication apparatus 100 includes a 3 G communications device 110 that uses a 3G antenna to communicate with the 3G network 400, the Wifi communications device 120 that uses a Wifi antenna to perform Wifi communication, and the RFID communications device (not depicted) that uses an RFID antenna to communicate. Further, in a storage device of the communication apparatus 100, an operating system (OS) group that includes the OS for the mobile terminal 200 is preliminarily stored.

The mobile terminal 200 is present onboard the vehicle 300. For example, the mobile terminal 200 is a mobile communications terminal of a passenger on the vehicle 300 and is capable of telephone communication and data communication. The mobile terminal 200 includes a 3 G communications device 210 that uses a 3G antenna to communicate with the 3G network 400, a Wifi communications device (not depicted) that uses a Wifi antenna to perform Wifi communication, and a RFID communications device (not depicted) that uses an RFID antenna to communicate. In this example, two mobile terminals 200 operating under OS1 and one mobile terminal 200 operating under OS2 are present onboard the vehicle 300.

The communication apparatus 100 generates therein, virtual terminals (emulator) 130 as substitutes for the mobile terminal 200. The virtual terminals 130 perform handover to the 3G network 400 in place of the mobile terminals 200, whereby the mobile terminals 200 are able to reduce power consumption since the power consuming process of handover need not be performed.

For example, as depicted in FIG. 1, Wifi communication is established between the mobile terminal 200 and the communication apparatus 100. The mobile terminal 200, through the Wifi communications device thereof, detects a radio wave from the Wifi communications device 120 of the communication apparatus 100 (scanning) and upon detecting the radio wave, transmits to the communication apparatus 100, information necessary for Wifi communication, establishing Wifi communication with the communication apparatus 100.

To establish Wifi communication, if the mobile terminal 200 does not use the Wifi communications device thereof for transmission, but rather uses the RFID communications device thereof to transmit the information necessary for Wifi communication, the power consumed by the Wifi communications device for the scanning process can be conserved.

The communication apparatus 100, upon establishment of Wifi communication with the mobile terminal 200, receives model information from the mobile terminal 200 and based on the model information, internally generates a virtual terminal 130 as a substitute for the mobile terminal 200. Model information is, for example, a code identifying the manufacturer, the model name, etc. of the mobile terminal 200 and from the model information, the OS of the mobile terminal 200 can be uniquely identified.

In the example, two mobile terminals 200 operating under OS1 and one mobile terminal 200 operating under OS2 are present onboard the vehicle 300. Therefore, the communication apparatus 100 prepares two virtual terminals 130 from OS1 and one virtual terminal 130 from OS2.

The virtual terminal 130, in place of the mobile terminal 200, performs handover to the 3G network 400. For example, at given intervals, the virtual terminal 130 detects the base station 410 having the greatest signal strength at the current position of the vehicle 300; and the virtual terminal 130 performs communication with the detected base station 410.

Further, as depicted by (A), when the vehicle 300 straddles cells of multiple base stations 410, the communication apparatus 100 switches communication from the current base station 410 to another base station 410 by handover.

When the mobile terminal 200 connects to the Internet (IP network) 500, the virtual terminal 130 of the communication apparatus 100 communicates with a server 510 of the IP network 500 by way of the 3G network 400. The communication apparatus 100 communicates with the mobile terminal 200 via Wifi communication. Consequently, the communication apparatus 100 relays communication between the server 510 of the IP network 500 and the mobile terminal 200, enabling the mobile terminal 200 to perform Internet communications.

Furthermore, when a mobile terminal 420 outside the vehicle 300 calls the mobile terminal 200, notification of the incoming call to the mobile terminal 200 is relayed by the virtual terminal 130 in the communication apparatus 100 and transmitted from the Wifi communications device 120 to the mobile terminal 200, whereby even with the 3 G communications device 210 of the mobile terminal 200 being in a disabled state, the mobile terminal 200 is able to receive notification of an incoming call.

When the mobile terminal 200 makes a call, the mobile terminal 200 requests the communication apparatus 100 for base station information and using the base station information received from the communication apparatus 100, is able to transmit an outgoing call request to the base station 410 of the mobile terminal 200. Base station information is the frequency and the signal strength of the radio wave received from base station 410. Further, base station information may include area information received from the base station 410.

Thus, the mobile terminal 200 is capable of Internet communication and telephone communication. Further, since the virtual terminal 130 of the communication apparatus 100 performs handover to preserve communication quality, the mobile terminal 200 can receive base station information from the communication apparatus 100 as necessary without performing handover to the 3G network 400. Therefore, the mobile terminal 200 can conserve the power that would have been consumed for handover.

Figure 3:
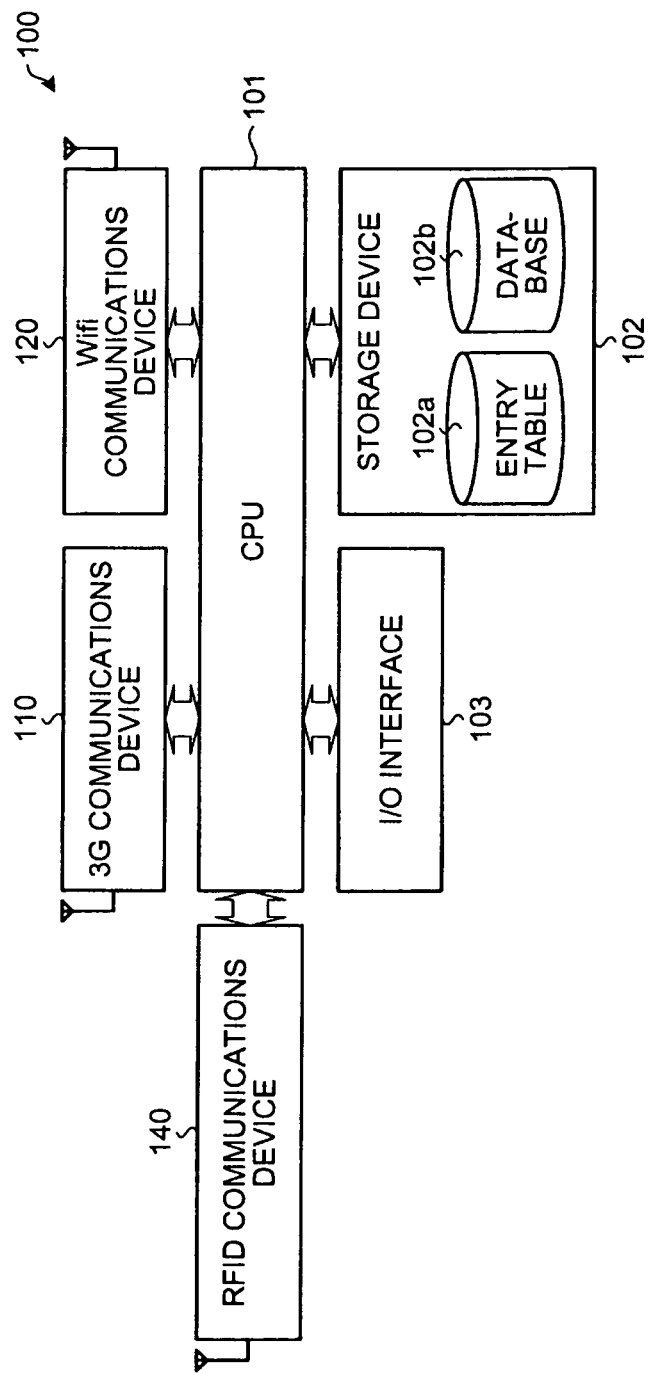
FIG. 3 is a block diagram of an exemplary hardware configuration of a communication apparatus 100 depicted in FIG. 2.

FIG. 3 is a block diagram of an exemplary hardware configuration of the communication apparatus 100 depicted in FIG. 2. In FIG. 3, the communication apparatus 100 includes a central processing unit (CPU) 101, a storage device 102, an I/O interface 103, the 3 G communications device 110, the Wifi communications device 120, and the RFID communications device 140.

The CPU 101 governs overall control of the communication apparatus 100. The storage device 102 stores therein a communication program. Further, the storage device 102 stores therein an entry table 102a and a database 102b of various types of OS implementing communication with the 3 G communication network 400 of the mobile terminal 200. Nonvolatile memory, flash memory, a hard disk drive, etc. may be employed as the storage device 102.

The I/O interface 103 is directly connected to an external apparatus and controls the input and output of data with respect to the external apparatus. A serial port, USB port, etc. may be employed for the I/O interface 103. The 3 G communications device 110 uses the 3G antenna to connect to a base station 410 of the 3G network 400 to perform data communication. The Wifi communications device 120 uses the Wifi antenna to connect to the Wifi communications device of the mobile terminal 200 to perform data communication. The RFID communications device 140 uses the RFID antenna to connect to the RFID communications device of the mobile terminal 200 to perform data communication.

Figure 4:
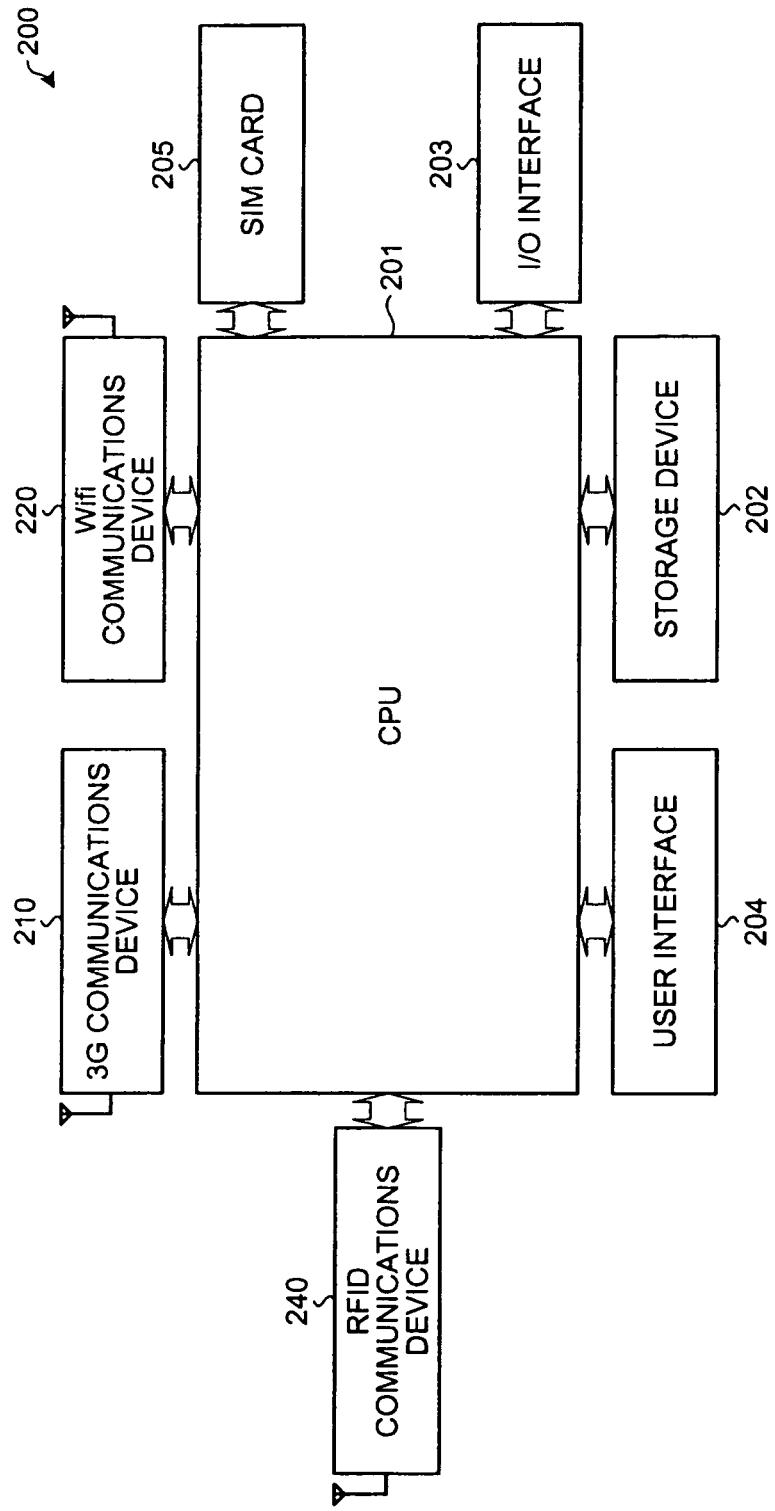
FIG. 4 is a block diagram of an exemplary hardware configuration of a mobile terminal 200 depicted in FIG. 2.

FIG. 4 is a block diagram of an exemplary hardware configuration of the mobile terminal 200 depicted in FIG. 2. As depicted in FIG. 4, the mobile terminal 200 includes a CPU 201, a storage device 202, an I/O interface 203, a user interface 204, a SIM card 205, the 3 G communications device 210, the Wifi communications device 220, and the RFID communications device 240.

The CPU 201 governs overall control of the mobile terminal 200. The storage device 202 stores therein the communication program. The I/O interface 203 is directly connected to an external and controls the input and output of data with respect to the external apparatus. A serial port, USB port, etc. may be employed for the I/O interface 203.

The user interface 204 controls the input and output of data from the user. A display, keyboard, mouse, etc. may be employed for the user interface 204. The SIM card 205 stores therein the subscriber identity module (SIM) number unique to the mobile terminal 200. The SIM number is a unique ID number (International Mobile Subscriber Identity (IMSI)) for identifying a telephone number.

The 3 G communications device 210 uses the 3G antenna to connect to a base station 410 of the 3G network 400 to perform data communication. The Wifi communications device 220 uses the Wifi antenna to connect to the Wifi communications device 120 of the communication apparatus 100 to perform data communication. The RFID communications device 240 uses RFID antenna to connect to the RFID communications device 140 of the communication apparatus 100 to perform data communication.

FIG. 5 is a diagram of the contents of the entry table 102a stored in the storage device 102 of the communication apparatus 100. As depicted in FIG. 5, a SIM number, a MAC address, an IP address, and model information is correlated with each entry in the entry table 102a. Further, the entry table 102a is connected to the mobile terminal 200 and the communication apparatus 100 and has a record for each virtual terminal 130 generated in the communication apparatus 100.

In the entry column, the mobile terminal 200 is connected with the communication apparatus 100 and the order (entry) in which the virtual terminals 130 are generated is stored, i.e., an entry is a number uniquely assigned to a virtual terminal 130. In the SIM number column, the SIM number of the mobile terminal 200 is stored.

In the MAC (media access control) address column, a MAC address unique to the mobile terminal 200 is stored. A MAC address is an address identifying the source or the destination of data and in the case of Ethernet (registered trade name), is a 48 bit (EUI-48) code. In the IP address column, an IP address assigned to the mobile terminal 200 by the communication apparatus 100 is stored.

In the model information column, information is stored that identifies the model of the mobile terminal 200 and is transmitted from the mobile terminal 200 to the communication apparatus 100.

FIG. 6 is a diagram of the contents of the database 102b stored in the storage device 102 of the communication apparatus 100. As depicted in FIG. 6, the database 102b has a record for each item in a model information column, where each record includes a corresponding OS and a corresponding application.

In the model information column, model information for the mobile terminal 200 is stored. In the corresponding OS column, the same OS as that configuring the mobile terminal 200 identified by the model information, is stored. In the corresponding application column, the same application as that configuring the mobile terminal 200 identified by the model information, is stored.

Here, using FIGS. 7 to 13, processing from the connection of Wifi communication between the communication apparatus 100 and the mobile terminal 200, to the disconnection thereof will be described. For example, first, using FIG. 7, the connection of Wifi communication between the communication apparatus 100 and the mobile terminal 200, occurring at the boarding point depicted in FIG. 1 will be described. In other words, in FIG. 7, the Wifi communication association of the communication apparatus 100 and the mobile terminal 200 depicted in FIG. 1, authentication of the mobile terminal 200 by the communication apparatus 100, and establishment of Wifi communication between the communication apparatus 100 and the mobile terminal 200 will be described.

Figure 7:
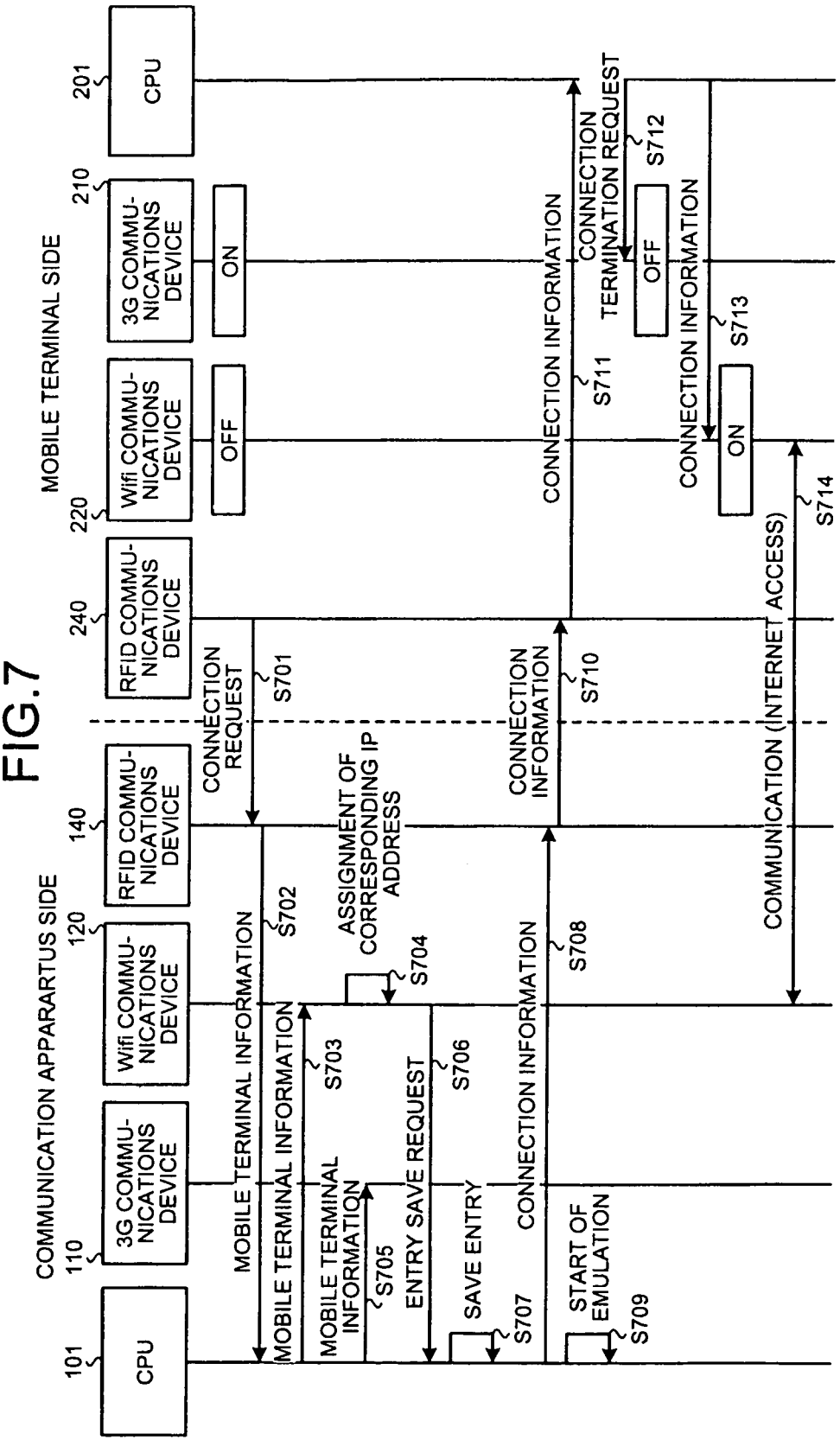
FIG. 7 is a sequence diagram of details of the connection of Wifi communication between the communication apparatus 100 and the mobile terminal 200.

FIG. 7 is a sequence diagram of details of the connection of the communication apparatus 100 and the mobile terminal 200 by Wifi communication. In FIG. 7, an example where the mobile terminal 200 is onboard the vehicle 300 and a connection request for Wifi communication has been made will be described.

Here, it is assumed that the RFID communications device 140 of the communication apparatus 100 is within the communication range of the RFID communications device 240 of the mobile terminal 200, enabling communication between the RFID communications devices 140 and 240. For example, the user of the mobile terminal 200 brings the RFID communications device 240 of the mobile terminal 200 in proximity of the RFID communications device 140 of the communication apparatus 100, causing transition to a communicable state.

When communication with the RFID communications device 140 of the communication apparatus 100 becomes possible, the RFID communications device 240 of the mobile terminal 200 transmits a connection request to the RFID communications device 140 of the communication apparatus 100 (step S701). Here, a connection request is configured by the MAC address of the mobile terminal 200, the SIM, and model information.

The RFID communications device 140 of the communication apparatus 100 transfers the received connection request, as mobile terminal information of the mobile terminal 200, to the CPU 101 of the communication apparatus 100 (step S702). Next, the CPU 101 of the communication apparatus 100 transfers the MAC address among the received mobile terminal information, to the Wifi communications device 120 (step S703). The Wifi communications device 120 having received the MAC address, assigns an IP address corresponding to the MAC address (step S704). Thus, the communication apparatus 100 associates the Wifi communication of the communication apparatus 100 and the mobile terminal 200.

The CPU 101 of the communication apparatus 100 transfers the SIM and the model information among the mobile terminal information, to the 3 G communications device 110 (step S705). The 3 G communications device 110 of the communication apparatus 100, via a base station 410, checks the validity of the SIM and the model information with a certification authority (for example, a telecommunications carrier of the mobile terminal 200) and authenticates the mobile terminal 200.

Further, the Wifi communications device 120 of the communication apparatus 100 transmits to the CPU 101 of the communication apparatus 100, a save request for a record that includes the assigned IP address, the SIM, and the MAC address (step S706). If the mobile terminal is not authenticated, the CPU 101 of the communication apparatus 100 discards the received save request for the record and does not perform connection of Wifi communication with the mobile terminal 200.

If the mobile terminal 200 is authenticated, the CPU 101 of the communication apparatus 100, stores as a record to the entry table 102a, the SIM, the MAC address, and the IP address included in the save request, upon receipt of the save request (step S707). Further, the CPU 101 of the communication apparatus 100 transfers to the RFID communications device 140, as connection information, the IP address included in the save request (step S708). The CPU 101 of the communication apparatus 100 identifies from the model information, the OS of the mobile terminal 200, generates a virtual terminal 130 corresponding to the identified OS, and begins emulation of the mobile terminal 200 (step S709).

The RFID communications device 140 of the communication apparatus 100 transmits to the RFID communications device 240 of the mobile terminal, the received connection information (step S710). The connection information is configured by a service set identifier (SSID), a channel, and an IP address.

Thus, the mobile terminal 200, without scanning for the Wifi communications device of the communication apparatus 100 by the Wifi communications device 220, is able to receive connection information for establishing Wifi communication. Therefore, the mobile terminal 200 is able to save the power conventionally consumed by the Wifi communications device 220 to scan for the Wifi communications device 120 of the communication apparatus 100.

Thereafter, the RFID communications apparatus 240 of the mobile terminal 200 transfers to the CPU 201 of the mobile terminal 200, the received connection information (step S711). The CPU 201 of the mobile terminal 200, upon receipt of the connection information, transmits a connection termination request to the 3 G communications device 210 (step S712). The connection termination request is a request to disable the 3 G communications device 210.

Further, the CPU 201 of the mobile terminal 200 transfers the connection information to the Wifi communications device 220 (step S713). The Wifi communications device 220 of the mobile terminal 200, based on the connection information, establishes Wifi communications with the communication apparatus 100 and through the communication apparatus 100, performs Internet communication (step S714).

In this manner, the communication apparatus 100 and the mobile terminal 200 establish Wifi communication therebetween and therefore, the mobile terminal 200, through the communication apparatus 100, is able to perform Internet communication.

Thus, the mobile terminal 200 causes the communication apparatus 100 to generate the virtual terminal 130 and perform handover, which is conventionally performed by the mobile terminal 200 to ensure the quality of telephone communication with the 3G network 400. Therefore, the mobile terminal 200 is able to reduce power consumption by not having to perform handover and disabling the 3 G communications device 210.

Moreover, since the user of the mobile terminal 200 is able to communicate with the 3G network 400 via the established Wifi communication and relay through the communication apparatus 100, the mobile terminal 200 can perform Internet communication and telephone communication, even if the 3 G communications device 210 has been disabled. Hereinafter, using FIG. 8, details of Internet communication relayed by the communication apparatus 100 will be described and using FIGS. 9 to 11, details of telephone communication relayed by the communication apparatus 100 will be described.

First, using FIG. 8, details of Internet communication through the communication apparatus 100 by the mobile terminal 200 that has established Wifi communication with the communication apparatus 100 at step S714 depicted in FIG. 7 will be described. In other words, details of Internet communication occurring between the boarding point and the disembarkation point depicted in FIG. 1 will be described.

Figure 8:
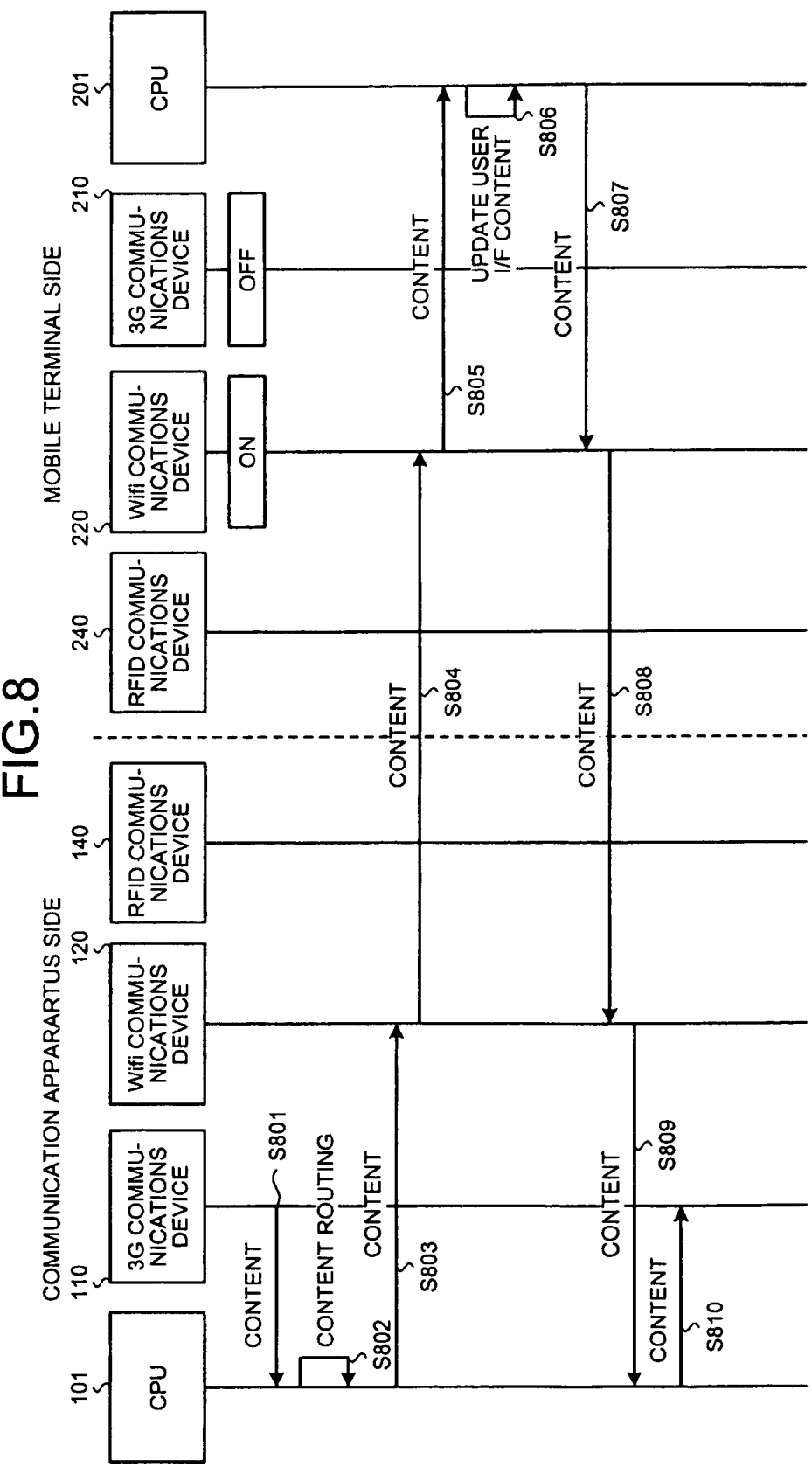
FIG. 8 is a sequence diagram of details of internet communication by the mobile terminal 200.

FIG. 8 is a sequence diagram of details of Internet communication by the mobile terminal 200. In FIG. 8, an example is given where the communication apparatus 100 receives, from the base station 410 via the 3 G communications device 110, content originating from a server 510. Furthermore, content transfer to the mobile terminal 200 by the communication apparatus 100 is also described. In FIG. 8, details of the transmission of content to the base station 410 by the mobile terminal 200 via the communication apparatus 100 will be described where the content is addressed to the server 510.

In other words, in FIG. 8, Internet communication between the mobile terminal 200 and the server 510 via the Wifi communications device 220 of the mobile terminal 200, the Wifi communications device 120 of the communication apparatus 100, the 3 G communications device 110, the base station 410, the 3G network 400, and the IP network 500 will be described.

As depicted in FIG. 8, the 3 G communications device 110 having received, from the base station 410, the content originating from the server 510, transfers the content to the CPU 101 of the communication apparatus 100 (step S801). Next, CPU 101 of the communication apparatus 100 routes the transferred content (step S802). Routing is the referencing of the entry table 102a to append the IP address assigned to the mobile terminal 200 to the received content as a destination IP address.

The CPU 101 of the communication apparatus 100 transfers the routed content to the Wifi communications device 120 (step S803). The Wifi communications device 120 having received the content, transmits the content to the Wifi communications device 220 of the mobile terminal 200 (step S804). In this manner, the communication apparatus 100 relays and transmits to the mobile terminal 200, the content originating from the server 510.

The Wifi communications device 220 of the mobile terminal 200 transfers the received content to the CPU 201 of the mobile terminal 200 (step S805). Next, the CPU 201 of the mobile terminal 200, based on the transferred content, updates the contents of the user interface 204 (step S806). Here, it is assumed that the user of the mobile terminal 200 has performed an operation of transmitting content addressed to the server 510, based on the updated contents of the user interface 204.

The CPU 201 of the mobile terminal 200, consequent to the user operation, transmits content to the Wifi communications device 220 (step S807). The Wifi communications device 220 having received the content, transmits the received content to the Wifi communications device 120 of the communication apparatus 100 (step S808). In this manner, the mobile terminal 200 transmits to the communication apparatus 100, content addressed to the server 510.

The Wifi communications device 120 of the communication apparatus 100 transfers the content to the CPU 101 of the communication apparatus 100 (step S809). The CPU 101 of the communication apparatus 100 having received the content, transfers the content to the 3 G communications device 110 (step S810). The 3 G communications device 110 transmits the content to the base station 410, whereby the content transmitted to the base station 410 is transmitted to the server 510.

Thus, the communication apparatus 100 and the mobile terminal 200 can mutually connect via the Wifi communications apparatuses 120 and 220. Further, the communication apparatus 100, by the 3 G communications device 110 and through the base station 410, can communicate with the server 510. Therefore, the communication apparatus 100 can relay Internet communication between the mobile terminal and the server 510, whereby the mobile terminal 200 can perform Internet communication, even if the 3 G communications device 210 is disabled. Further, the mobile terminal 200 can reduce power consumption by disabling the 3 G communications device 210 and by not performing handover to the 3G network 400.

Next, using FIGS. 9 to 11, telephone communication by the mobile terminal 200 connected by Wifi communication to communication apparatus 100 will be described. In other words, details of telephone communication occurring between the boarding point and the disembarkation point depicted in FIG. 1 will be described. For example, incoming call notification of telephone communication between the mobile terminal 200 and the mobile terminal 420 outside the vehicle 300, communication of a telephone communication request, or communication of the contents of telephone communication is relayed by the communication apparatus 100.

Here, the contents of telephone communication are, for example, communicated by Voice over Internet Protocol (VoIP) technology. For example, after converting the telephone communication contents, which is audio data, into packets, by the communication of the packets by the communication apparatus 100 and the mobile terminal 200, the contents of the telephone communication are transmitted and received. Thus, by relaying incoming call notification, outgoing call requests, and the contents of telephone communication through the communication apparatus 100, the mobile terminal 200 can perform telephone communication with the mobile terminal 420, while the 3 G communications device 210 remains disabled.

Figure 9:
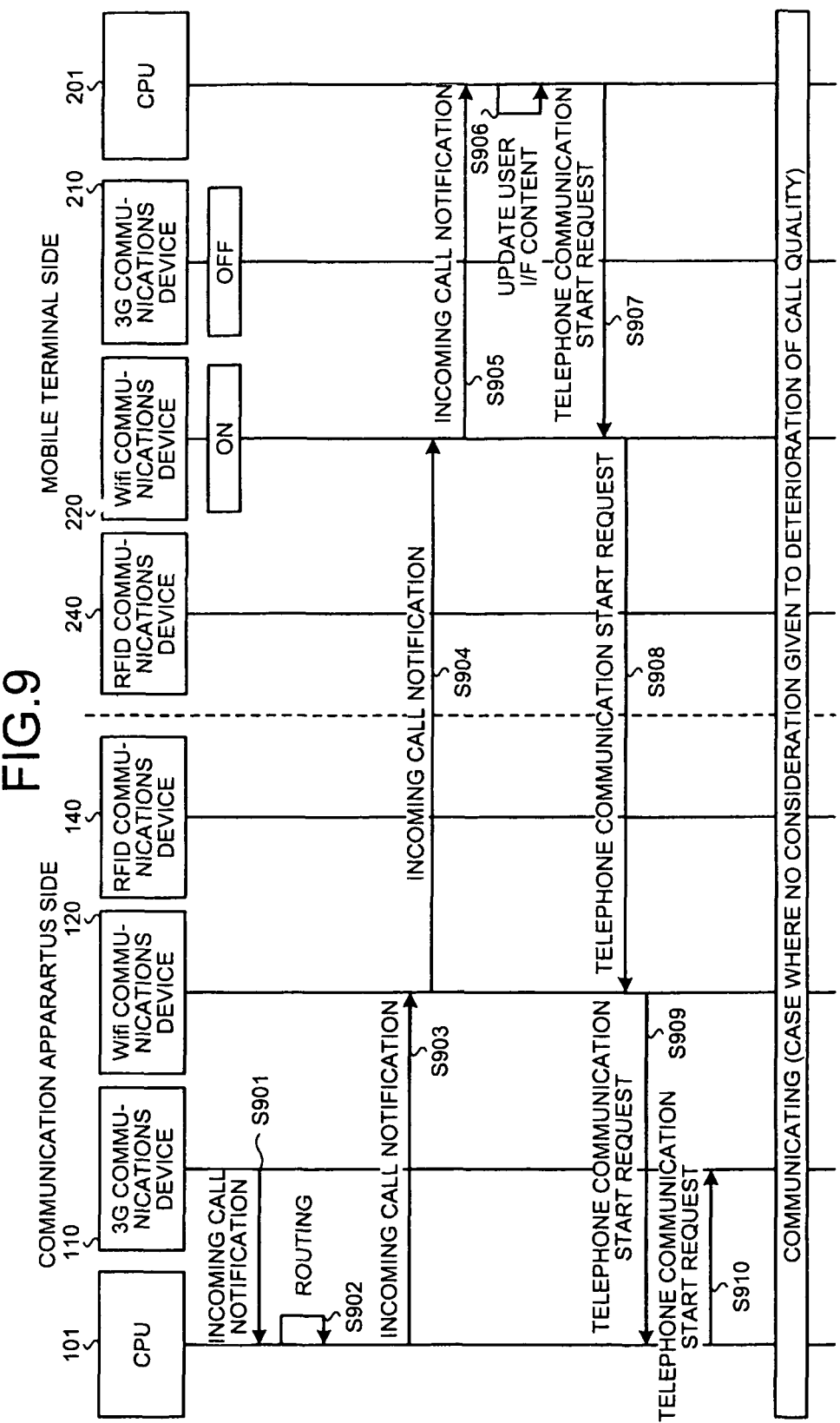
FIG. 9 is a sequence diagram of details of a call from a mobile terminal 420 outside the vehicle 300, to the mobile terminal 200 connected to the communication apparatus 100 by Wifi communication.
Figure 10:
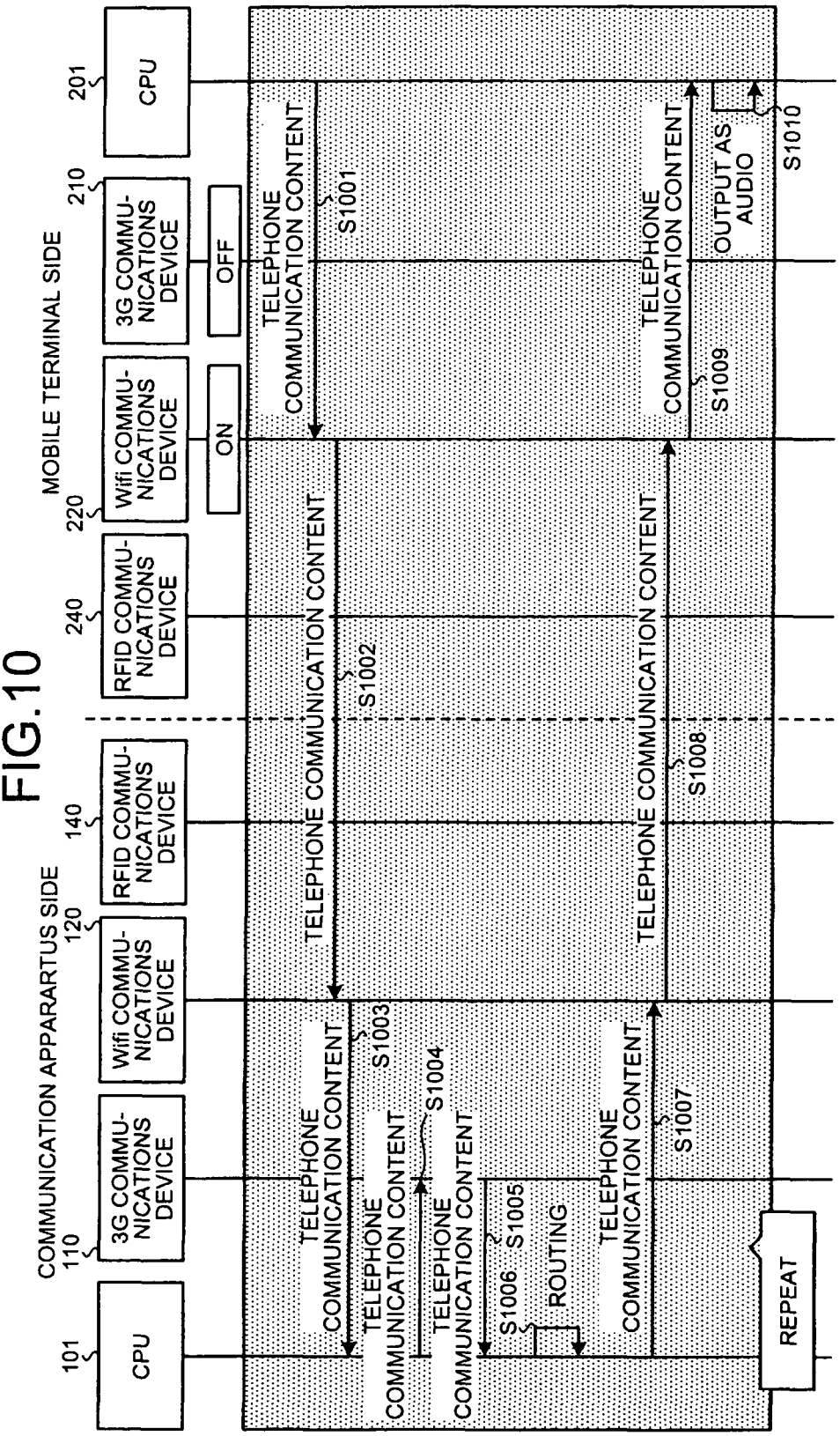
FIG. 10 is a sequence diagram of details of telephone communication by the mobile terminal 200 that initiated telephone communication with the mobile terminal 420.
Figure 11:
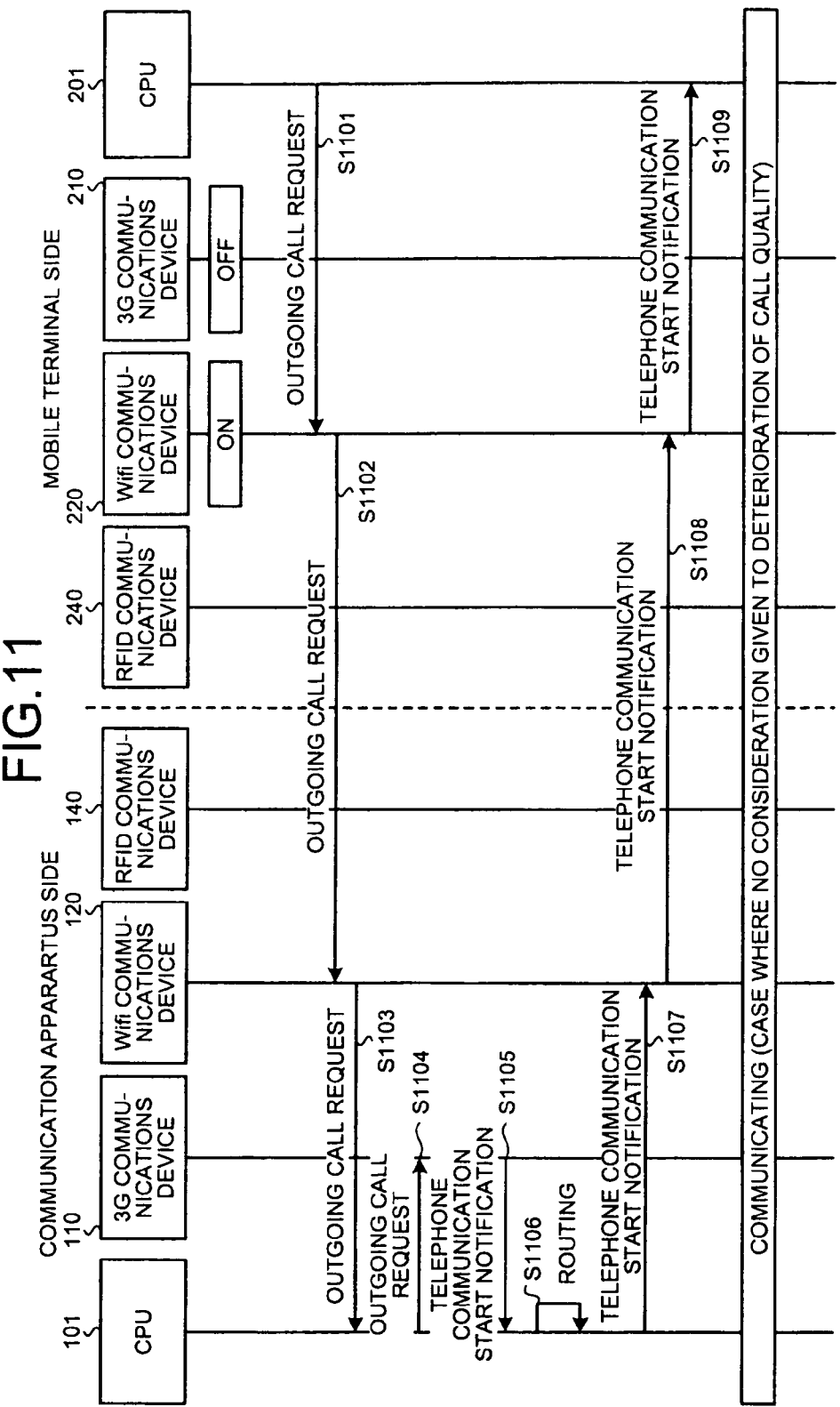
FIG. 11 is a sequence diagram of details of a call from the mobile terminal 200 connected to the communication apparatus 100 by Wifi communication, to the mobile terminal 420 outside the vehicle 300.

In other words, in FIGS. 9 to 11, telephone communication between the mobile terminal 200 and the mobile terminal 420 is performed by a path through the Wifi communications device 220 of the mobile terminal 200, the Wifi communications device 120 and the 3 G communications device 110 of the communication apparatus 100, the base station 410, and the 3G network 400. Here, first, a call from the mobile terminal 420 outside the vehicle 300, to the mobile terminal 200 connected by Wifi communication to the communication apparatus 100 will be described, using FIG. 9.

FIG. 9 is a sequence diagram of details of a call from the mobile terminal 420 outside the vehicle 300, to the mobile terminal 200 connected by Wifi communication to the communication apparatus 100. Here, the 3 G communications device 210 of the mobile terminal 200 is disabled. Therefore, consequent to a call from the mobile terminal 420 outside the vehicle 300, to the mobile terminal 200, the virtual terminal 130 in the communication apparatus 100 receives, by the 3 G communications device 110, the incoming call notification from the mobile terminal 420 outside the vehicle 300. The incoming call notification is the telephone number of the person making the call.

As depicted in FIG. 9, upon receiving the incoming call notification from the mobile terminal 420, the 3 G communications device 110 of the communication apparatus 100 transfers the incoming call notification to the CPU 101 of the communication apparatus 100 (step S901). Next, the CPU 101 of the communication apparatus 100 routes the transferred incoming call notification (step S902).

The CPU 101 of the communication apparatus 100 transfers to the Wifi communications device 120, the incoming call notification that has been routed (step S903). The Wifi communications device 120 having received the incoming call notification, transmits the incoming call notification to the Wifi communications device 220 of the mobile terminal 200 (step S904).

The Wifi communications device 220 of the mobile terminal 200 transfers the received incoming call notification to the CPU 201 of the mobile terminal 200 (step S905). Next, the CPU 201 of the mobile terminal 200 updates user interface 204 content based on the incoming call notification (step S906).

The CPU 201 of the mobile terminal 200, consequent to a user operation, transmits a telephone communication start request to the Wifi communications device 220 (step S907). The Wifi communications device 220 having received the telephone communication start request, transmits the telephone communication start request to the Wifi communications device 120 of the communication apparatus 100 (step S908).

The Wifi communications device 120 of the communication apparatus 100 transfers the telephone communication start request to the CPU 101 of the communication apparatus 100 (step S909). The CPU 101 of the communication apparatus 100 to which the telephone communication start request was transferred, transfers the telephone communication start request to the 3 G communications device 110 (step S910), whereby telephone communication can start between the mobile terminal 200 and the mobile terminal 420. Next, details of telephone communication with the mobile terminal 420, initiated by the mobile terminal 200 will be described, using FIG. 10.

FIG. 10 is a sequence diagram of details of the telephone communication with the mobile terminal 420 initiated by the mobile terminal 200. As depicted in FIG. 10, the CPU 201 of the mobile terminal 200 transfers telephone communication content to the Wifi communications device 220 (step S1001). Next, the Wifi communications device 220 of the mobile terminal 200 having received the telephone communication content, transmits the telephone communication content to the Wifi communications device 120 of the communication apparatus 100 (step S1002).

The Wifi communications device 120 having received the telephone communication content, transfers the telephone communication content to the CPU 101 of the communication apparatus 100 (step S1003). Next, the CPU 101 of the communication apparatus 100 transfers the telephone communication content to the 3 G communications device 110 (step S1004). The 3 G communications device 110 having received the telephone communication content, transmits the telephone communication content to the mobile terminal 420 and transmits to the CPU 101, telephone communication content sent in response from mobile terminal 420 (step S1005).

Next, the CPU 101 of the communication apparatus 100 routes the received telephone communication content (step S1006). The CPU 101 of the communication apparatus 100 transfers the routed telephone communication content to the Wifi communications device 120 (step S1007). Next, the Wifi communications device 120 of the communication apparatus 100 transmits the telephone communication content to the Wifi communications device 220 of the mobile terminal 200 (step S1008).

The Wifi communications device 220 of the mobile terminal 200 having received the telephone communication content, transmits the telephone communication content to the CPU 201 (step S1009). The CPU 201 of the mobile terminal 200 having received the telephone communication content, uses the user interface 204 to output the telephone communication content as audio (step S1010). This processing is repeated, enabling the mobile terminal 200 and the mobile terminal 420 to perform telephone communication.

Thus, the mobile terminal 200 is able to perform telephone communication while the 3 G communications device 210 remains disabled and thereby, is able to reduce energy consumption. Next, using FIG. 11, a case will be described in which the mobile terminal 200 connected by Wifi communication to the communication apparatus 100 makes a call to the mobile terminal 420 outside the vehicle 300.

FIG. 11 is a sequence diagram of details of a call from the mobile terminal 200 connected by Wifi communication to the communication apparatus 100, to the mobile terminal 420 outside the vehicle 300. Here, the 3 G communications device 210 of the mobile terminal 200 is in a disabled state. Therefore, without directly calling the mobile terminal 420 through the base station 410, the mobile terminal 200 makes the call through the communication apparatus 100. Here, an example is described where the user of the mobile terminal 200 has performed an operation to call the mobile terminal 420 outside the vehicle 300.

As depicted in FIG. 11, the CPU 201 of the mobile terminal 200 transfers the outgoing call request to the Wifi communications device 220 (step S1101). Next, the Wifi communications device 220 of the mobile terminal 200 having received the outgoing call request, transmits the outgoing call request to the Wifi communications device 120 of the communication apparatus 100 (step S1102).

The Wifi communications device 120 having received the outgoing call request, transfers the outgoing call request to the CPU 101 of the communication apparatus 100 (step S1103). Next, the CPU 101 of the communication apparatus 100 transfers the outgoing call request to the 3 G communications device 110 (step S1104). The 3 G communications device 110 having received the outgoing call request, transmits a telephone communication start notification to the CPU 101 (step S1105).

Next, the CPU 101 of the communication apparatus 100 routes the received telephone communication start notification (step S1106). The CPU 101 of the communication apparatus 100 transfers the routed telephone communication start notification to the Wifi communications device 120 (step S1107). Next, the Wifi communications device 120 of the communication apparatus 100 transmits the telephone communication start notification to the Wifi communications device 220 of the mobile terminal 200 (step S1108).

The Wifi communications device 220 of the mobile terminal 200 having received the telephone communication start notification, transmits the telephone communication start notification to the CPU 201 (step S1109). The mobile terminal 200 and the mobile terminal 420 start telephone communication. For example, by repeatedly performing the processing described with reference to FIG. 10 above, the mobile terminal 200 and the mobile terminal 420 can perform telephone communication.

Next, disconnection of Wifi communication between the communication apparatus 100 and the mobile terminal 200 will be described, using FIGS. 12 and 13. Here, to describe disconnection of the Wifi connection, an example will be given where the mobile terminal 200 transmits a connection termination request to the communication apparatus 100 when the user of the mobile terminal 200 disembarks from the vehicle 300 at the disembarkation point depicted in FIG. 1.

Figure 12:
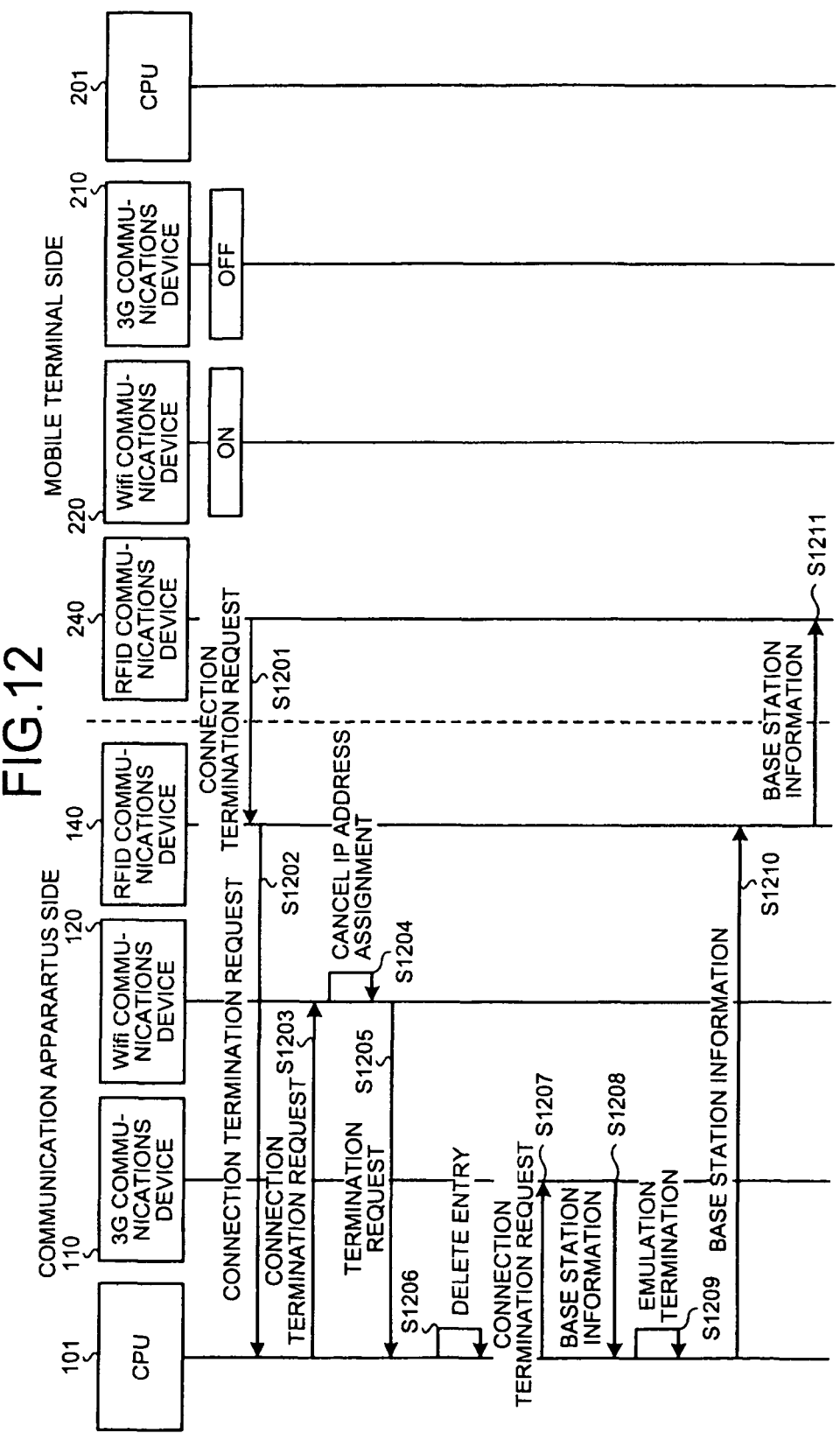
FIG. 12 is the first part of a sequence diagram of details of disconnection of Wifi communication between the communication apparatus 100 and the mobile terminal 200.

FIG. 12 is the first part of a sequence diagram of disconnection of Wifi communication between the communication apparatus 100 and the mobile terminal 200. As depicted in FIG. 12, the RFID communications device 240 of the mobile terminal 200 transmits a connection termination request to the RFID communications device 140 of the communication apparatus 100 (step S1201). The connection termination request, for example, is a request to the communication apparatus 100 for transmission of base station information and for deletion of the virtual terminal 130. Further, the connection termination request includes the MAC address and the SIM number of the mobile terminal 200.

The CPU 101 of the communication apparatus 100 receives the connection termination request transferred from RFID communications device 140 (step S1202). Next, the CPU 101 of the communication apparatus 100 transmits to the Wifi communications device 120, the MAC address in the connection termination request (step S1203). The Wifi communications device 120 having received the MAC address, cancels the IP address assigned to the received MAC address (step S1204). The Wifi communications device 120 transmits to the CPU 101 of the communication apparatus 100, a termination request to delete from the entry table 102a, the record corresponding to the received MAC address (step S1205).

The CPU 101 of the communication apparatus 100, upon receiving the termination request, deletes from the entry table 102a, the record corresponding to the MAC address (step S1206). Next, the CPU 101 of the communication apparatus 100 transfers the connection termination request to the 3 G communications device 110 (step S1207). The 3 G communications device 110 having received the connection termination request, transmits to the CPU 101, base station information identifying the optimal base station 410 (step S1208). The optimal base station 410 is the base station 410 from which, among plural base stations 410 on the 3G network, the 3 G communications device 110 receives the strongest radio wave (the base station 410 having the best communication quality).

The CPU 101 of the communication apparatus 100 deletes the virtual terminal 130 and terminates emulation (step S1209). Further, the CPU 101 of the communication apparatus 100 transmits the received base station information to the RFID communications device 140 (step S1210). Next, the RFID communications device 140 of the communication apparatus 100 transmits the base station information to the RFID communications device 240 of the mobile terminal 200 (step S1211) and the flow proceeds to step S1301 in FIG. 13.

Figure 13:
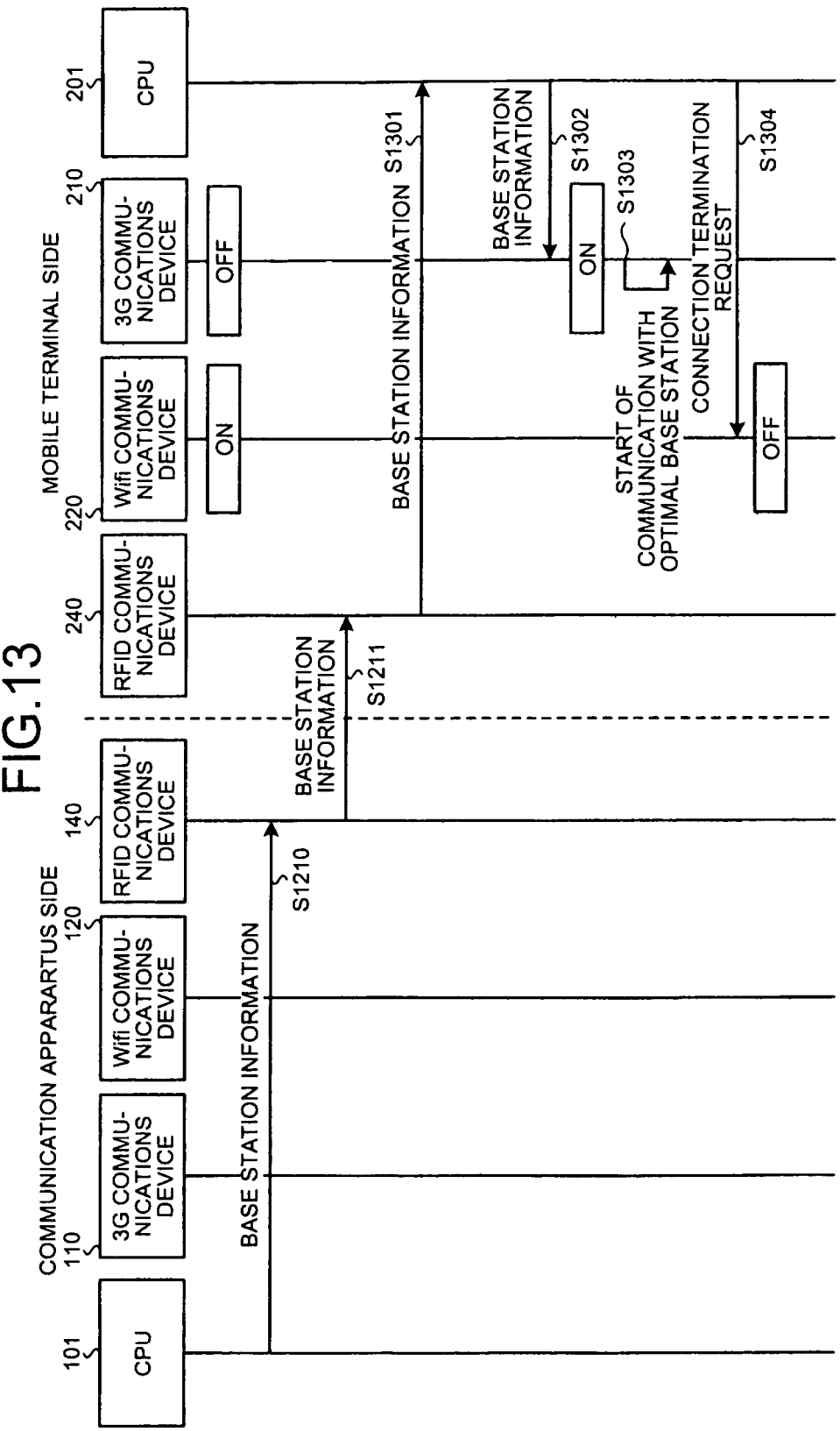
FIG. 13 is the second part of a sequence diagram of details of the disconnection of Wifi communication between the communication apparatus 100 and the mobile terminal 200.

FIG. 13 is the second part of a sequence diagram of the disconnection of Wifi communication between the communication apparatus 100 and the mobile terminal 200. As depicted in FIG. 13, the RFID communications device 240 of the mobile terminal 200 having received the base station information, transmits the base station information to the CPU 201 (step S1301). The CPU 201 of the mobile terminal 200 transfers the base station information to the 3 G communications device 210 (step S1302).

Next, the 3 G communications device 210 of the mobile terminal 200 commences communication with the optimal base station 410 identified by the base station information (step S1303). The CPU 201 of the mobile terminal 200 transmits a connection termination request to the Wifi communications device 220 (step S1304).

Thus, the communication apparatus 100, in response to a request from the mobile terminal 200, can transmit base station information. Therefore, the mobile terminal 200 can connect to the optimal base station 410 on the 3G network. Further, the communication apparatus 100 deletes the virtual terminal 130 corresponding to the mobile terminal 200 to thereby, enable interference with the mobile terminal 200 to be prevented.

Next, using FIGS. 14 to 17, telephone communication by the mobile terminal 200 will be described in a case where telephone communication quality is improved. Here, to improve telephone communication quality, the connection to the communication apparatus 100 by the Wifi communication is terminated and the mobile terminal 200 uses the 3 G communications device 210 thereof to perform telephone communication with the mobile terminal 420 outside the vehicle 300. In other words, the mobile terminal 200 and the mobile terminal 420 perform telephone communication by a path through the 3 G communications device 210 of the mobile terminal 200, the base station 410, and the 3G network 400.

Firstly, using FIGS. 14 and 15, telephone communication of the mobile terminal 200 will be described in the case of a call from the mobile terminal 420 outside the vehicle 300, to the mobile terminal 200 connected to the communication apparatus 100 by Wifi communication.

Figure 14:
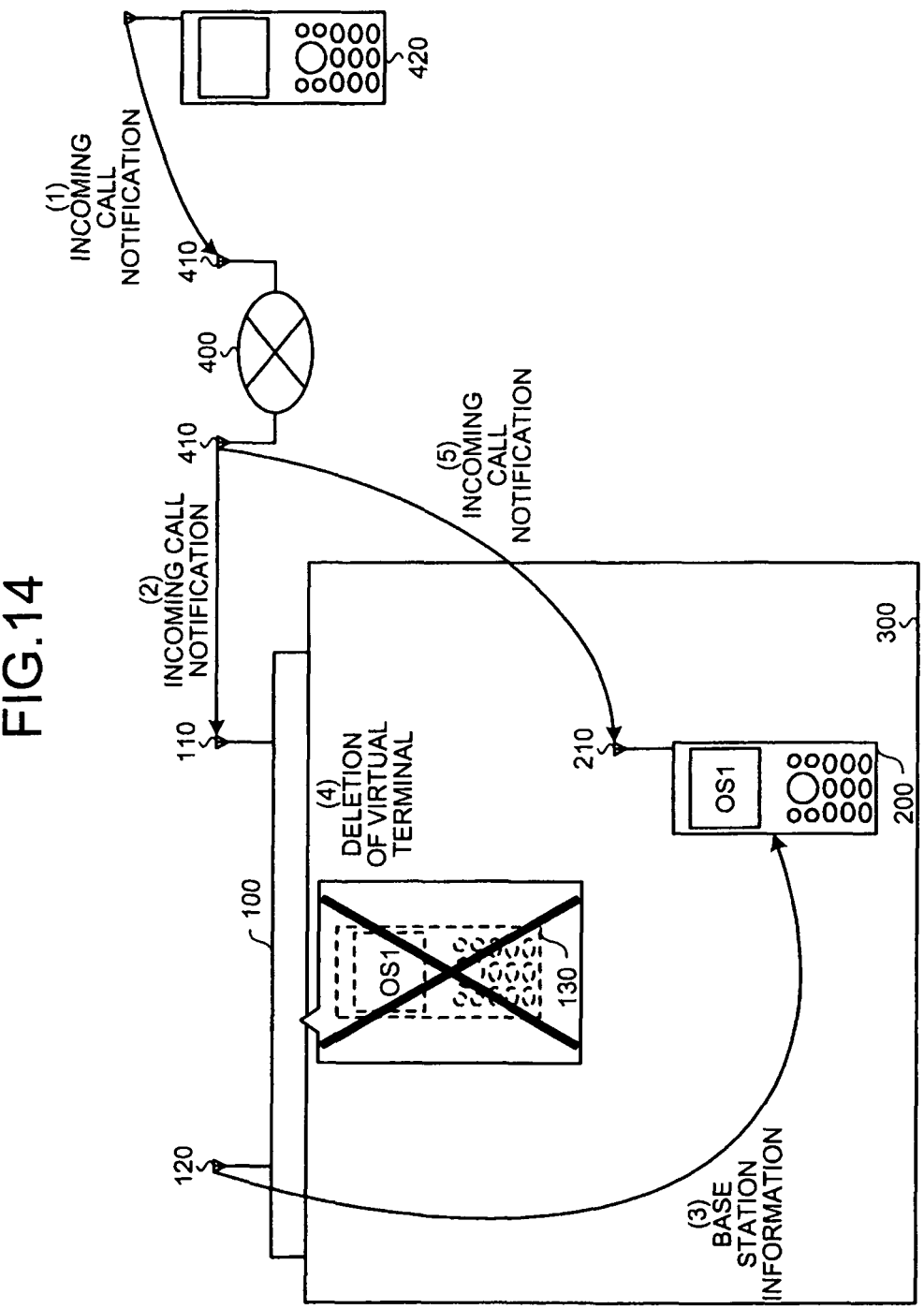
FIG. 14 is a diagram of an example of a call to the mobile terminal 200 from the mobile terminal 420 outside the vehicle 300, in a case where telephone communication quality is improved.

FIG. 14 is a diagram of an example of a call from the mobile terminal 420 outside the vehicle 300, to the mobile terminal 200, in a case where telephone communication is improved. FIG. 14 depicts a state in which Wifi communication is established between the communication apparatus 100 and the mobile terminal 200, and the virtual terminal 130 has been generated at the communication apparatus 100.

When incoming call notification to the mobile terminal 200 is transmitted from the mobile terminal 420 outside the vehicle 300, first (1) an incoming call notification is transmitted from the mobile terminal 420 outside the vehicle 300 to a base station 410. The incoming call notification is transmitted from a base station 410 in the vicinity of the vehicle 300 by way of the 3G network 400. At this time, since the 3 G communications device 210 of the mobile terminal 200 is in a disabled state, (2) the incoming call notification is transmitted to the virtual terminal 130 of the communication apparatus 100.

The communication apparatus 100, upon receiving the incoming call notification, (3) transmits base station information to the mobile terminal 200, and (4) deletes the virtual terminal 130. The connection between the communication apparatus 100 and the mobile terminal 200 by Wifi communication is terminated. Consequently, the mobile terminal 200 itself can connect to the 3G network 400 and perform telephone communication and furthermore, interference with the virtual terminal 130 can be prevented.

The mobile terminal 200 having received the base station information activates the 3 G communications device 210 to be in a communicable state and connects to the 3G network 400, and then (5) receives the incoming call notification from the base station 410 and commences telephone communication. In this manner, the mobile terminal 200 is able to receive an incoming call. Thereafter, the mobile terminal 200 itself connects to the 3G network 400 and performs telephone communication. Thus, the mobile terminal 200 uses the 3 G communications device 210 thereof to connect to the 3G network 400 via the base station 410 and is able to perform high quality telephone communication with the mobile terminal 420.

After the call has been completed, the mobile terminal 200 may request the communication apparatus 100 to generate a virtual terminal 130 and may again disable the 3 G communications device 210 of the mobile terminal 200. In this manner, the communication apparatus 100 again performs handover to the 3G network 400 in place of the mobile terminal 200, enabling reduced power consumption by the mobile terminal 200.

Figure 15:
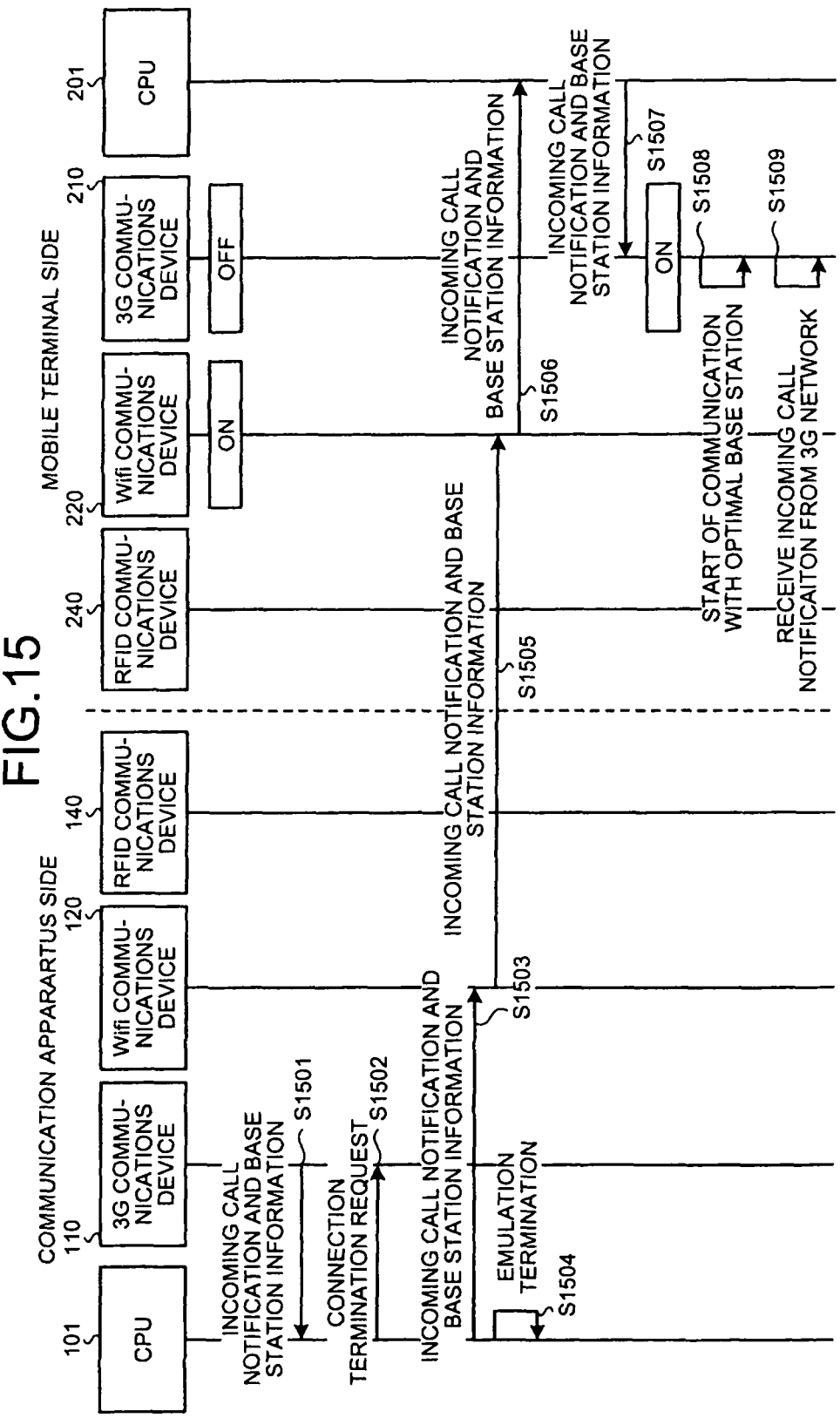
FIG. 15 is a sequence diagram of details of a call from the mobile terminal 420 outside the vehicle 300 to the mobile terminal 200, in the case depicted in FIG. 14 where telephone communication quality is improved.

FIG. 15 is a sequence diagram of details of a call from the mobile terminal 420 outside the vehicle 300, to the mobile terminal 200, in a case where telephone communication quality is improved. Here, the 3 G communications device 210 of the mobile terminal 200 is in a disabled state. Therefore, consequent to the call from the mobile terminal 420 outside the vehicle to the mobile terminal 200, the virtual terminal 130 in the communication apparatus 100, via the 3 G communications device 110, receives the incoming call notification from the mobile terminal 420 outside the vehicle 300. The incoming call notification is the telephone number of the caller.

As depicted in FIG. 15, upon receiving the incoming call notification from the mobile terminal 420, the 3 G communications device 110 of the communication apparatus 100 transfers the incoming call notification and the base station information for the optimal base station 410, to the CPU 101 of the communication apparatus 100 (step S1501).

Next, the CPU 101 of the communication apparatus 100 transfers a connection termination request to the 3 G communications device 110 (step S1502), and further transfers the incoming call notification and the base station information to the Wifi communications device 120 (step S1503).

Next, the CPU 101 of the communication apparatus 100 deletes the virtual terminal 130 and terminates the emulation of the mobile terminal 200 (step S1504). The Wifi communications device 120 having received the transferred incoming call notification and base station information, transmits the incoming call notification and the base station information to the Wifi communications device 220 of the mobile terminal 200 (step S1505).

Next, the Wifi communications device 220 of the mobile terminal 200 having received the incoming call notification and the base station information, transfers the incoming call notification and the base station information to the CPU 201 of the mobile terminal 200 (step S1506). The CPU 201 of the mobile terminal 200 transfers the received incoming call notification and the base station information to the 3 G communications device 210 (step S1507), activating the 3 G communications device 210.

Next, the 3 G communications device 210 commences communication with the optimal base station 410 indicated by the base station information (step S1508), and directly receives from the 3G network 400, incoming call notification and commences telephone communication (step S1509). Thus, the mobile terminal 200, using the 3 G communications device 210 thereof, connects to the 3G network 400 via the base station 410 to be able to perform high quality telephone communication with the mobile terminal 420. The connection by Wifi communication may be maintained and used for just connecting to the Internet.

Next, using FIGS. 16 and 17, telephone communication of the mobile terminal 200 will be described in a case where the mobile terminal 200 connected by Wifi communication to the communication apparatus 100 makes a call to the mobile terminal 420 outside the vehicle 300.

Figure 16:
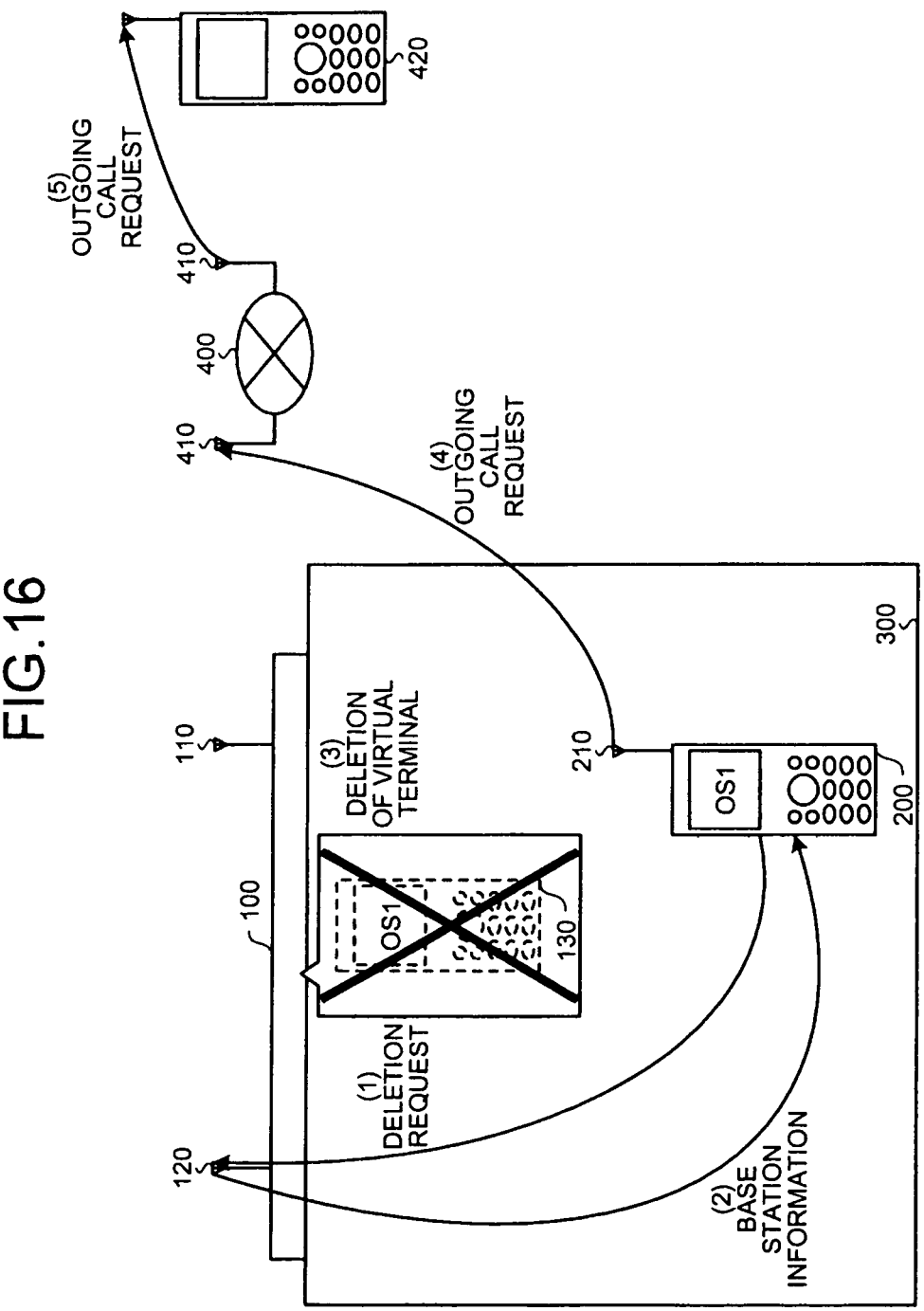
FIG. 16 is a diagram of an example of a call from the mobile terminal 200 to the mobile terminal outside 420 the vehicle 300, in a case where telephone communication quality is improved.

FIG. 16 is a diagram of an example of an outgoing call from the mobile terminal 200 to the mobile terminal 420 outside the vehicle 300, in a case where telephone communication quality is improved. FIG. 16 depicts a state in which Wifi communication is established between the communication apparatus 100 and the mobile terminal 200, and the virtual terminal 130 has been generated at the communication apparatus 100.

Here, it is assumed that the user of the mobile terminal 200 has performed an operation to make a call to a mobile terminal 420 outside the vehicle 300. Consequent to the user operation, when an outgoing call request is transmitted from the mobile terminal 200 to the mobile terminal 420 outside the vehicle 300, first (1) the mobile terminal 200 transmits to the communication apparatus 100, a termination request for the virtual terminal 130.

The communication apparatus 100 having received the termination request, (2) transmits base station information to the mobile terminal 200, and (3) deletes the virtual terminal 130. The connection of the communication apparatus 100 and the mobile terminal 200 by Wifi communication is terminated. In this manner, the mobile terminal 200 itself can connect to the 3G network 400 and perform telephone communication and furthermore, prevent interference by the virtual terminal 130.

The mobile terminal 200 having received the base station information, activates the 3 G communications device 210 to be in a communicable state and connects to the 3G network 400, and then (4) transmits an outgoing call request to the base station 410, and (5) the outgoing call request is transmitted to the mobile terminal 420 outside the vehicle 300 by way of the 3G network 400. In this manner, the mobile terminal 200 can make an outgoing call. Thereafter, the mobile terminal 200 itself connects to the 3G network 400 and performs telephone communication, whereby the mobile terminal 200, using the 3 G communications device 210 thereof, connects to the 3G network 400 via the base station 410 and is able to perform high quality telephone communication with the mobile terminal 420.

After the call has been completed, the mobile terminal 200 may request the communication apparatus 100 to generate a virtual terminal 130 and may again disable the 3 G communications device 210 of the mobile terminal 200. In this manner, the communication apparatus 100 again performs handover to the 3G network 400 in place of the mobile terminal 200, enabling reduced power consumption by the mobile terminal 200.

Figure 17:
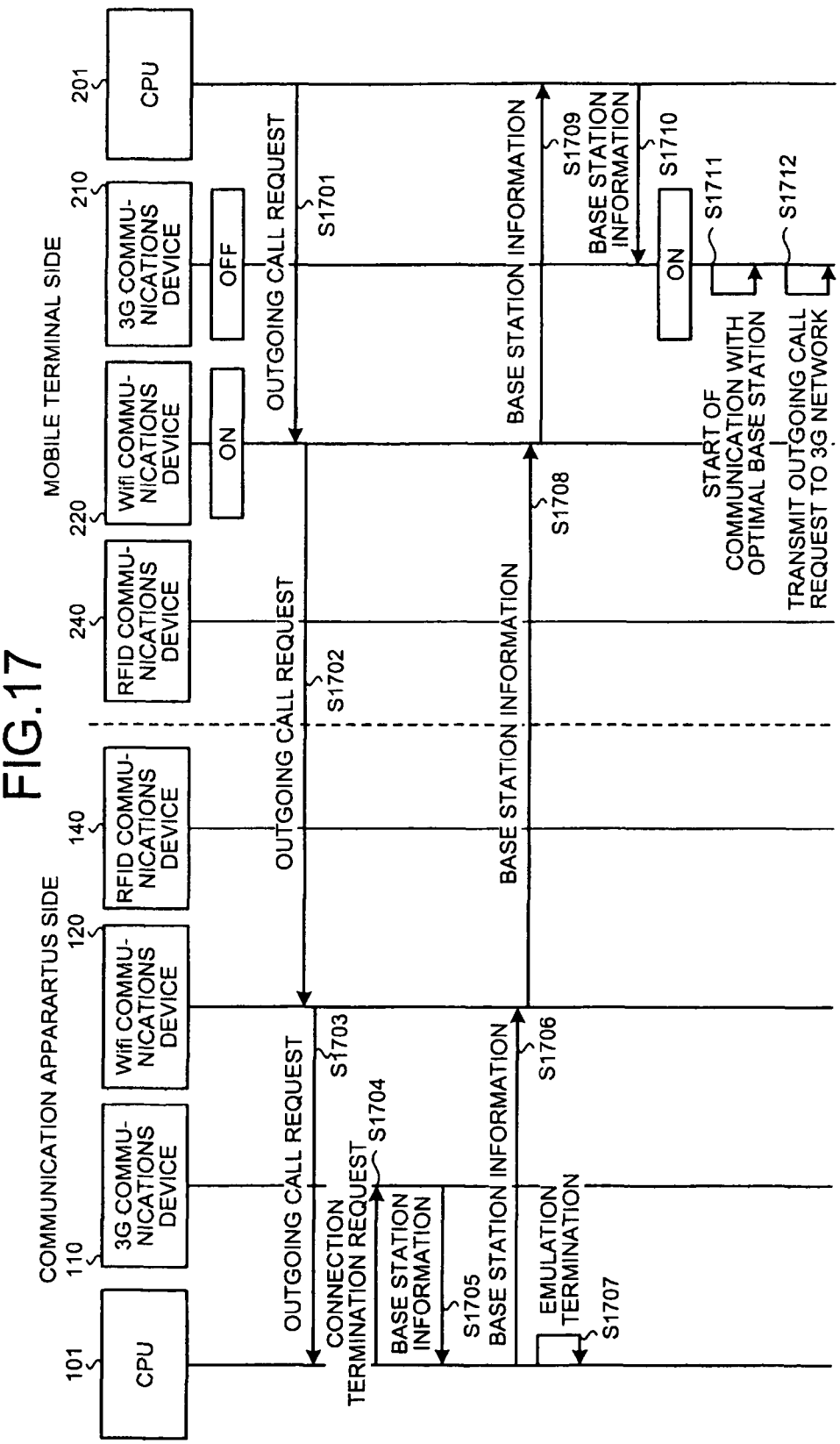
FIG. 17 is a sequence diagram of details of an outgoing call from the mobile terminal 200 to the mobile terminal 420 outside the vehicle 300, in the case depicted in FIG. 16 where telephone communication quality is improved.

FIG. 17 is a sequence diagram of details of a call from the mobile terminal 200 to the mobile terminal 420 outside the vehicle 300, in a case where telephone communication is improved. Here, it is assumed that the user of the mobile terminal 200 has performed an operation to make a call to a mobile terminal 420 outside the vehicle 300.

As depicted in FIG. 17, consequent to the user operation, the CPU 201 of the mobile terminal 200 transfers an outgoing call request to the Wifi communications device 220 (step S1701). Next, the Wifi communications device 220 of the mobile terminal 200 having received the outgoing call request, transmits the outgoing call request to the Wifi communications device 120 of the communication apparatus 100 (step S1702). The outgoing call request, for example, is a request to the communication apparatus 100, for the transmission of the base station information and for the deletion of the virtual terminal 130.

The Wifi communications device 120 having received the outgoing call request transfers the outgoing call request to the CPU 101 of the communication apparatus 100 (step S1703). Next, the CPU 101 of the communication apparatus 100 transfers a connection termination request to the 3 G communications device 110 (step S1704). The 3 G communications device 110 having received the connection termination request, transmits to the CPU 101, base station information identifying the optimal base station 410 (step S1705).

The CPU 101 of the communication apparatus 100 transmits the received base station information to the Wifi communications device 120 (step S1706). Further, the CPU 101 of the communication apparatus 100 deletes the virtual terminal 130 and terminates emulation (step S1707). Next, the Wifi communications device 120 of the communication apparatus 100 transmits base station information to the Wifi communications device 220 of the mobile terminal 200 (step S1708).

Subsequently, the Wifi communications device 220 of the mobile terminal 200 having received the base station information, transmits the base station information to the CPU 201 (step S1709). The CPU 201 of the mobile terminal 200 transfers the base station information to the 3 G communications device 210 (step S1710).

Next, the 3 G communications device 210 of the mobile terminal 200 commences communication with the optimal base station 410 indicated by the base station information (step S1711), and further transmits an outgoing call request directly to the 3G network 400 and commences telephone communication (step S1712). Thus, the mobile terminal, using the 3 G communications device 210 thereof, connects to the 3G network via the base station 410 to be able to perform high quality telephone communication with the mobile terminal 420. The connection by Wifi communication may be maintained and used just for connecting to the Internet.

Next an exemplary functional configuration will be described of the communication apparatus 100 and of the mobile terminal 200 that execute the processing mentioned above.

Figure 18:
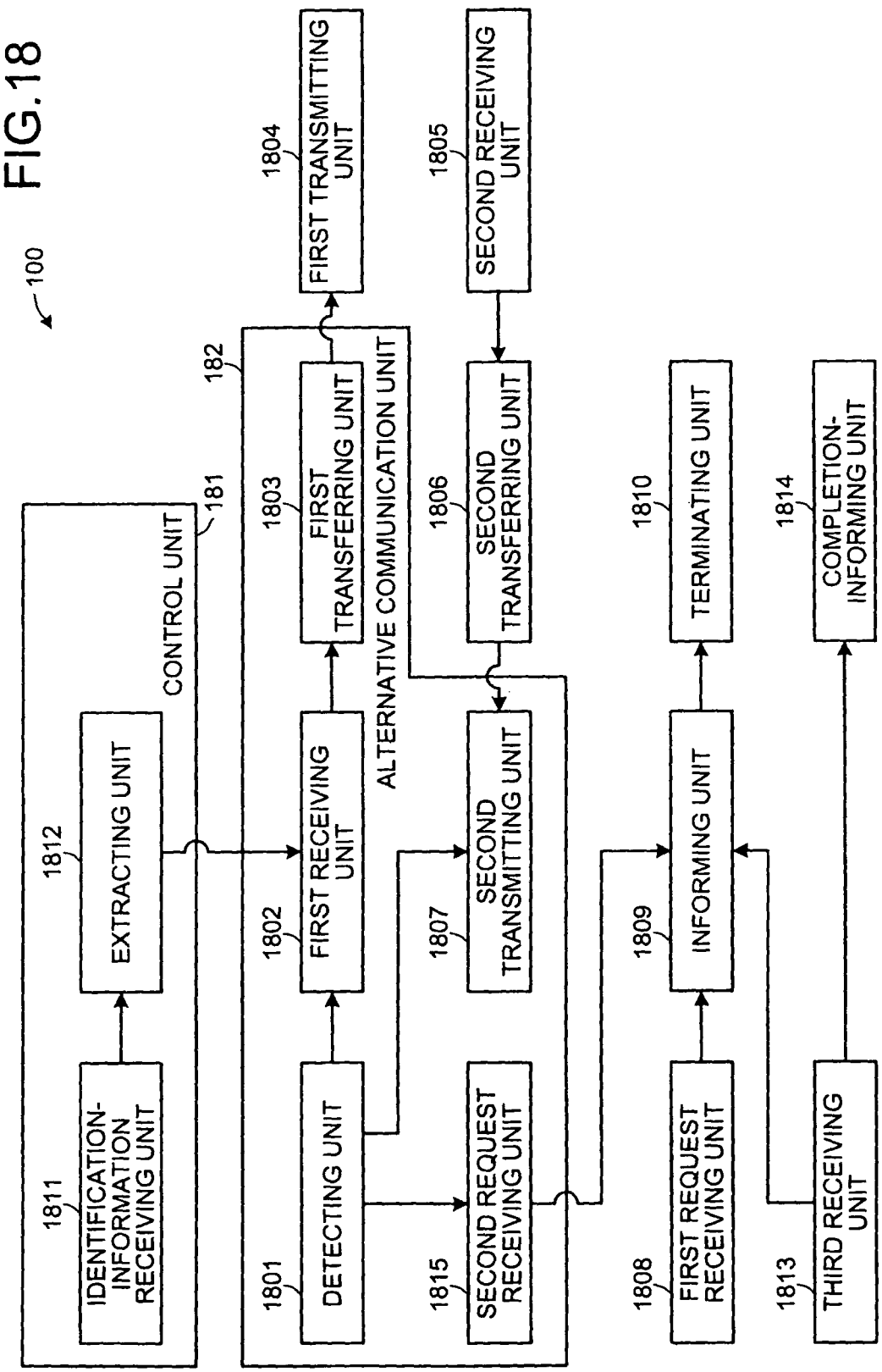
FIG. 18 is a block diagram of an exemplary functional configuration of the communication apparatus 100.

FIG. 18 is a block diagram of an exemplary functional configuration of the communication apparatus 100. As depicted in FIG. 18, the communication apparatus 100 includes a detecting unit 1801, a first receiving unit 1802, a first transferring unit 1803, a first transmitting unit 1804, a second receiving unit 1805, a second transferring unit 1806, a second transmitting unit 1807, a first request receiving unit 1808, an informing unit 1809, a terminating unit 1810, an identification-information receiving unit 1811, an extracting unit 1812, a third receiving unit 1813, a completion-informing unit 1814, and a second request receiving unit 1815.

Here, the detecting unit 1801, the first receiving unit 1802, the first transferring unit 1803, the second transmitting unit 1807, and the second request receiving unit 1815 are included in an alternative communication unit 182. Further, the identification-information receiving unit 1811 and the extracting unit 1812 are included in a control unit 181. Here, the alternative communication unit 182 is the virtual terminal 130 and has a communication function of the mobile terminal 200 that communicates with a base station 410 in the mobile communications network.

The detecting unit 1801 has a function of causing a first communication unit to detect a base station 410 in a communications network of the communication apparatus 100.

Here, the mobile communications network is the above radio communications network outside the vehicle, such as for example, the 3G network 400. The first communication unit is a unit for communicating with the 3G network 400, such as for example, the above 3 G communications device 110 of the communication apparatus 100.

The detecting unit 1801, for example, uses the 3 G communications device 110 to receive radio waves from multiple base stations 410 in the 3G network 400 and among the received radio waves, the base station 410 having the greatest signal strength is detected.

In this manner, among the base stations 410 whose radio wave was received, the detecting unit 1801 detects the base station 410 having the best communication quality (i.e., the base station 410 having the greatest signal strength; "optimal base station" above). In other words, the detecting unit 1801 can perform handover to the 3G network 400 in place of the mobile terminal 200.

This function, the detecting unit 1801, for example, is implemented by executing on the CPU 101, the communication program stored in the storage device 102 depicted in FIG. 3.

The first receiving unit 1802 has a function of causing, by the control unit, the first communication unit (e.g., the 3 G communications device 110) to receive data from the base station 410 detected by the detecting unit 1801. Here, data is data received using the 3 G communications device 110, e.g., content received from the server 510 in the IP network 500 by way of the 3G network 400 and telephone communication received from a mobile terminal 420 by way of the 3G network 400.

For example, the first receiving unit 1802 uses the 3 G communications device 110 to receive content from the server 510 in the IP network 500 by way of the 3G network 400. Further, the first receiving unit 1802 uses the 3 G communications device 110 to receive telephone communication from a mobile terminal 420 by way of the 3G network 400. In this manner, the first receiving unit 1802 is able to receive data in place of the mobile terminal 200.

This function, the first receiving unit 1802, for example, is implemented by executing on the CPU 101, the communication program stored in the storage device 102 depicted in FIG. 3.

The first transferring unit 1803 has a function of causing the data received by the first receiving unit 1802 to be transferred to a second communication unit. Here, the second communication unit is an intercommunication unit between the communication apparatus 100 and the mobile terminal 200, such as for example, the above Wifi communications device 120 of the communication apparatus 100.

For example, the first transferring unit 1803 transfers to the Wifi communications device 120, the data received via the 3 G communications device 110. In this manner, the first transferring unit 1803 can relay data from the server 510 or a mobile terminal 420 to the mobile terminal 200.

This function, the first transferring unit 1803, for example, is implemented by executing on the CPU 101, the communication program stored in the storage device 102 depicted in FIG. 3.

The first transmitting unit 1804 has a function of transmitting to the mobile terminal 200, the data transferred to the second communication unit (e.g., the Wifi communications device 120) by the first transferring unit 1803. For example, the first transmitting unit 1804 uses the Wifi communications device 120 to transmit data to the mobile terminal 200. In this manner, the first transmitting unit 1804 can implement communication from the server 510 or a mobile terminal 420 to the mobile terminal 200.

This function, the first transmitting unit 1804, for example, is implemented by executing on the CPU 101, the communication program stored in the storage device 102 depicted in FIG. 3.

The second receiving unit 1805 has a function of receiving data from the mobile terminal 200, by the second communication unit (e.g., the Wifi communications device 120). Here, the data is data received using the Wifi communications device 120, such as for example, telephone communication or content from the mobile terminal 200.

For example, the second receiving unit 1805 uses the Wifi communications device 120 to receive telephone communication or data from the mobile terminal 200. In this manner, the second receiving unit 1805 can receive data from the mobile terminal 200.

This function, the second receiving unit 1805, for example, is implemented by executing on the CPU 101, the communication program stored in the storage device 102 depicted in FIG. 3.

The second transferring unit 1806 has a function of transferring to the first communication unit (e.g., the 3 G communications device 110), the data received by the second receiving unit 1805. For example, the second transferring unit 1806 transfers data received via the Wifi communications device 120 to the 3 G communications device 110. In this manner, the second transferring unit 1806 can relay data from the mobile terminal 200 to the server 510 or a mobile terminal 420.

This function, the second transferring unit 1806, for example, is implemented by executing on the CPU 101, the communication program stored in the storage device 102 depicted in FIG. 3.

The second transmitting unit 1807 has a function of causing the first communication unit (e.g., the 3 G communications device 110) to transmit to the base station 410 detected by the detecting unit 1801, the data transferred by the second transferring unit 1806.

For example, the second transmitting unit 1807 uses the 3 G communications device 110 to transmit content to the server 510 in the IP network 500, by way of the 3G network 400. Further, the second transmitting unit 1807 uses the 3 G communications device 110 to transmit telephone communication to a mobile terminal 420, by way of the 3G network 400. In this manner, the second transmitting unit 1807 can implement communication from the mobile terminal 200 to the server 510 or a mobile terminal 420.

This function, the second transmitting unit 1807, for example, is implemented by executing on the CPU 101, the communication program stored in the storage device 102 depicted in FIG. 3.

The first request receiving unit 1808 has a function of receiving from the mobile terminal 200 and by the second communication unit (e.g., the Wifi communications device 120), a termination request requesting termination of the execution of the communication function. The termination request, for example, is transmitted from the mobile terminal 200 by a user operation, when the mobile terminal 200 moves from inside the vehicle 300 to outside the vehicle 300. Further, the termination request, for example, is transmitted from the mobile terminal 200, when the mobile terminal 200 makes a call consequent to a user operation. In other words, the termination request is transmitted when the mobile terminal 200 itself connects to the 3G network 400.

For example, the request receiving unit 1808 uses the Wifi communications device 120 to receive from the mobile terminal 200, the termination request for the virtual terminal 130. Consequently, when the mobile terminal 200 itself connects to the 3G network 400, the first request receiving unit 1808 can delete the virtual terminal 130.

Further, the second request receiving unit 1815 has a function of causing the first communication device (e.g., the 3 G communications device 110) to receive a communication request that is from the base station 410 to the mobile terminal 200. For example, the second request receiving unit 1815 receives a communication request (incoming call notification) from the mobile terminal 420, via the 3G network 400. Consequently, the second request receiving unit 1815 can receive a communication request (incoming call notification) in place of the mobile terminal 200.

These functions, the first request receiving unit 1808 and the second request receiving unit 1815, for example, are implement by executing, on the CPU 101, the communication program stored in the storage device depicted in FIG. 3.

The informing unit 1809 has a function of informing, by the second communication unit (the Wifi communications device 120), the mobile terminal 200 of the base station information that identifies the base station 410 detected by the detecting unit 1801, if a communication request has been received by the second request receiving unit 1815. Here, the base station information is the frequency and the signal strength of the radio wave received from the base station 410. Further, base station information may include area information received from the base station 410.

For example, the informing unit 1809 informs the mobile terminal 200 of the frequency and the signal strength of the radio wave received from the optimal base station 410 above. Consequently, the informing unit 1809 can inform the mobile terminal 200 of the base station information identifying the optimal base station 410 to be used when the mobile terminal 200 itself connects to the 3G network 400.

Further, the informing unit 1809 has a function of informing, by the second communication unit, the mobile terminal 200 of the base station information that identifies the base station 410 detected by the detecting unit 1801, if a termination request has been received by the first request receiving unit 1808. The second communication unit is, for example, the Wifi communications device 120.

For example, the informing unit 1809 informs the mobile terminal 200 of the frequency and the signal strength of the radio wave received from the optimal base station 410. In this manner, the informing unit 1809 can inform the mobile terminal 200 of the base station information identifying the optimal base station 410 to be used when the mobile terminal 200 itself connects to the 3G network 400.

This function, the informing unit 1809, for example, is implemented by executing on the CPU 101, the communication program stored in the storage device 102 depicted in FIG. 3.

The terminating unit 1810 has a function of terminating the execution of the communication function by control unit 181, if base station information has been reported by the informing unit 1809. For example, the terminating unit 1810 deletes the virtual terminal 130. Consequently, interference by the virtual terminal 130 can be prevented when the mobile terminal 200 itself connects to the 3G network 400.

This function, the terminating unit 1810, for example, is implemented by executing on the CPU 101, the communication program stored in the storage device 102 depicted in FIG. 3.

The identification-information receiving unit 1811 has a function of receiving by the second communication unit and from the mobile terminal 200, identification information uniquely identifying the communication function of the mobile terminal 200 performing communication with a base station on the mobile communications network. Here, the identification information is information that can identify the OS implementing the communication function of the mobile terminal 200, such as for example, the model information of the mobile terminal 200.

For example, the identification-information receiving unit 1811 uses the Wifi communications device 120 to receive from the mobile terminal 200, the model information for the mobile terminal 200. In this manner, the identification-information receiving unit 1811 can identify the OS of the mobile terminal 200.

The identification-information receiving unit 1811 has a function of receiving by a third communication unit and from the mobile terminal 200, identification information that uniquely identifies the communication function of the mobile terminal 200 performing communication with the base station in the mobile communications network. Here, the third communication unit is an intercommunication unit between the communication apparatus 100 and the mobile terminal 200, a communication unit of the mobile terminal 200 and having lower power consumption than the second communication unit. The third communication unit is, for example, the RFID communications device 140 of the communication apparatus 100.

For example, the identification-information receiving unit 1811 uses the RFID communications device 140 to receive from the mobile terminal 200, model information of the mobile terminal 200. In this manner, the identification-information receiving unit 1811 can identify the type of OS in the mobile terminal 200.

This function, the identification-information receiving unit 1811, for example, is implemented by executing on the CPU 101, the communication program stored in the storage device 102 depicted in FIG. 3.

The extracting unit 1812 has a function of controlling based on the received identification information, an alternative communication unit of the mobile terminal 200 that is among various types of alternative communication units that implement a communication function. Here, the various types of alternative communication units are various types of OS and are stored in the database 102b. An extracted OS is the virtual terminal 130.

For example, the extracting unit 1812 extracts from the database 102b, the OS identified by the identification information to be the OS used by the mobile terminal 200. Consequently, the extracting unit 1812 can extract the OS to become the virtual terminal 130 according to the model type of the mobile terminal 200.

This function, the extracting unit 1812, for example, is implemented by executing on the CPU 101, the communication program stored in the storage device 102 depicted in FIG. 3.

The third receiving unit 1813 has a function of receiving, by the third communication unit, identifying information that is unique to the mobile terminal 200. Here, the identifying information unique to the mobile terminal 200 is the MAC address and the SIM number unique to the mobile terminal 200. For example, the third receiving unit 1813 uses the RFID communications device 140 to receive from the mobile terminal 200, the MAC address and the SIM number of the mobile terminal 200. Consequently, by using the RFID communications device 140, the third receiving unit 1813 can receive the MAC address and the SIM number necessary for Wifi communication with the mobile terminal 200.

This function, the third receiving unit 1813, for example, is implemented by executing on the CPU 101, the communication program stored in the storage device 102 depicted in FIG. 3.

The completion-informing unit 1814 has a function of providing by the second communication unit and based on the identifying information received by the third receiving unit 1813, connection-completion notification to the mobile terminal 200. Here, the connection-completion notification is notification indicating that connection between the communication apparatus 100 and the mobile terminal 200 via the Wifi communications device 120 has been completed.

The completion-informing unit 1814, for example, using the MAC address received by the third receiving unit 1813 as a destination, informs the mobile terminal 200 of connection completion. Consequently, the completion-informing unit 1814 can establish connection with the mobile terminal 200.

This function, the completion-informing unit 1814, for example, is implemented by executing on the CPU 101, the communication program stored in the storage device 102 depicted in FIG. 3.

Figure 19:
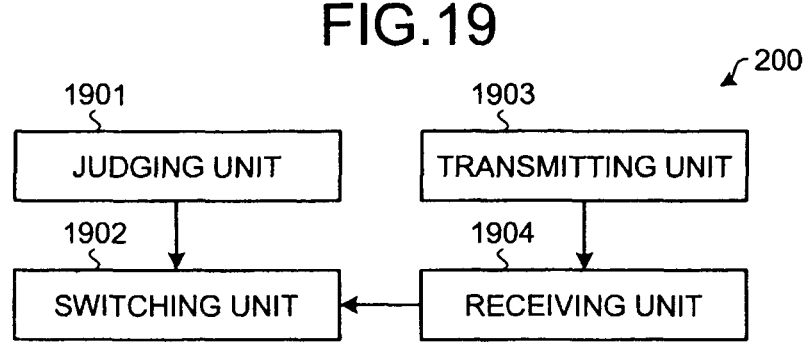
FIG. 19 is a block diagram of an exemplary functional configuration of the mobile terminal 200.

FIG. 19 is a block diagram of an exemplary functional configuration of the mobile terminal 200. As depicted in FIG. 19, the mobile terminal 200 includes a judging unit 1901, a switching unit 1902, a transmitting unit 1903, and a receiving unit 1904.

The judging unit 1901 has a function of judging whether connection with the communication apparatus 100 by the second communication unit is established. Here, the second communication unit is an intercommunication unit between the communication apparatus 100 and the mobile terminal 200, such as for example, the above Wifi communications device 220 of the mobile terminal 200.

For example, the judging unit 1901 uses the Wifi communications device 220 to transmit a connection request to the communication apparatus 100 and judges whether connection-completion notification has been received from the communication apparatus 100. Consequently, the judging unit 1901 can judge whether connection with the communication apparatus 100 has been established by the Wifi communications device 220.

The judging unit 1901 has a function of judging that connection by the second communication unit has been established, if connection-completion notification has been received by the receiving unit 1904. Here, the connection-completion notification is notification indicating that connection between the communication apparatus 100 and the mobile terminal 200 by the Wifi communications device 220 has been completed.

For example, the judging unit 1901 uses the Wifi communications device 220 to transmit a connection request to the communication apparatus 100 and judges whether connection-completion notification from the communication apparatus 100 has been received. Consequently, the judging unit 1901 can judge whether connection with the communication apparatus 100 by the Wifi communications device 220 is established.

The judging unit 1901, for example, implements this function by executing on the CPU 201, the communication program stored in the storage device 202 depicted in FIG. 4.

The switching unit 1902 has a function of switching the first communication unit from a communicable state to a disabled state, if the judging unit 1901 has judged that connection by the second communication unit has been established. Here, the first communication unit is a communication unit communicating with the 3G network 400, such as for example, the 3 G communications device 210 of the mobile terminal 200.

For example, the switching unit 1902 switches the 3 G communications device 210 to a disabled state, if connection by the Wifi communications device 220 has been established. The disable state is, for example, a state in which the 3 G communications device 210 is powered off.

The switching unit 1902, for example, implements this function by executing on the CPU 201, the communication program stored in the storage device 202 depicted in FIG. 4.

The transmitting unit 1903 has a function of transmitting to the communication apparatus 100 and via the third communication unit, a connection request for connection between the communication apparatus 100 and the mobile terminal 200 via the second communication unit. Here, the connection request is identifying information unique to the mobile terminal 200, such as for example, the MAC address and the SIM number. The third communication unit is an intercommunication unit between the communication apparatus 100 and the mobile terminal 200, a communication unit of the mobile terminal 200 and having lower power consumption than the second communication unit. The third communication unit is, for example, the RFID communications device 240 of the mobile terminal 200.

For example, the transmitting unit 1903 uses the RFID communications device 240 to transmit to the communication apparatus 100, the MAC address and the SIM number of the mobile terminal 200. In this manner, the transmitting unit 1903 can transmit identifying information that is used by the communication apparatus 100 to establish connection with the mobile terminal 200.

This function, the transmitting unit 1903, for example, is implemented by executing on the CPU 201, the communication program stored in the storage device 202 depicted in FIG. 4.

The receiving unit 1904 has a function of receiving via the third communication unit and from the communication apparatus 100, connection-completion notification for the connection between the communication apparatus 100 and the mobile terminal 200 by the second communication unit. For example, the receiving unit 1904 receives from the communication apparatus 100 and via the RFID communications device 240, connection-completion notification. In this manner, the receiving unit 1904 can receive connection-completion notification for the connection between the communication apparatus 100 and the mobile terminal 200.

The receiving unit 1904, for example, implements this function by executing on the CPU 201, the communication program stored in the storage device 202 depicted in FIG. 4.

Thus, according to the exemplary functional configuration of the mobile terminal 200 above, the mobile terminal 200, using the Wifi communications device 220 or the RFID communications device 240, can establish Wifi communication with the communication apparatus 100.

In this manner, in the embodiment above, the communication apparatus 100 generates a virtual terminal 130 corresponding to a mobile terminal 200 onboard the vehicle 300 and the generated virtual terminal 130 uses the 3 G communications device 110 to perform handover to the 3G network 400 in place of the mobile terminal 200 onboard the vehicle 300. Therefore, the mobile terminal 200, without the need for repeatedly performing handover, is able to facilitate reduced mobile terminal power consumption.

Further, the communication apparatus 100 is in a communicable state with the 3G network 400 via the 3 G communications device 110 and with Wifi communication being established between the mobile terminal 200 and the communication apparatus 100, the communication apparatus 100 is further in a communicable state with the mobile terminal 200 via Wifi communication. The communication apparatus 100 becomes able to relay data communication between the base station 410 and the mobile terminal 200 via the generated virtual terminal 130 corresponding to the mobile terminal 200.

In other words, the communication apparatus 100 can relay and transfer to the mobile terminal 200, incoming call notification that is from a mobile terminal 420 outside the vehicle 300 to the mobile terminal 200. Further, the communication apparatus 100 can relay and transfer to a base station 410, a telephone communication request that is from the mobile terminal 200 to a mobile terminal 420 outside the vehicle 300. Moreover, the communication apparatus 100 can relay telephone communication content between a mobile terminal 420 outside the vehicle 300 and the mobile terminal 200. In addition, the communication apparatus 100 can relay communication content between a server 510 on the IP network 500 and the mobile terminal 200.

Thus, the user of the mobile terminal 200 can perform Internet communication/telephone communication, even if the 3 G communications device 210 of the mobile terminal 200 is disabled. Therefore, while onboard the vehicle 300, the 3 G communications device 210 of the mobile terminal 200 is generally disabled, facilitating a reduction in power consumption without imposing inconvenience on the user of the mobile terminal 200.

The mobile terminal 200, upon disembarkation, requests base station information from the communication apparatus 100, enabling the 3 G communications device 210 to be reactivated to be in a communicable state. Consequently, upon disembarkation, communication with the most optimal base station 410 can commence even if handover is not performed while onboard the vehicle 300.

Further, when transmitting a telephone communication request or receiving incoming call notification, the mobile terminal 200 may request base station information from the communication apparatus 100 and perform high quality telephone communication by activating the 3 G communications device 210.

Moreover, the mobile terminal 200 receives, via the RFID communications device 240, connection information necessary for establishing Wifi communication with the communication apparatus 100. Consequently, the mobile terminal 200 can receive connection information for establishing Wifi communication, without using the Wifi communications device 220 and scanning for the Wifi communications device 120 of the communication apparatus 100. Therefore, the mobile terminal 200 is able to conserve the power conventionally consumed by the Wifi communications device 220 for scanning for the Wifi communications device 120 of the communication apparatus 100.

The communication system, the communication program, the communication apparatus, the mobile terminal, and communication method according to the present invention enable consideration to be given to the continuity of telephone communication via the mobile terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system that performs communication between a mobile terminal and a communication apparatus that are onboard a vehicle, wherein
the mobile terminal comprises:
a first communication unit that communicates with a base station on a mobile communications network,
a second communication unit that communicates with communication apparatus,
a determining unit that determines whether connection with the communication apparatus has been established by the second communication unit, and
a switching unit that suspends power supply to the first communication unit, when the determining unit determines that that connection by the second communication unit is established;
the communication apparatus comprises:
a third communication unit that communicates with the base station on the mobile communications network,
a fourth communication unit that communicates with the mobile terminal and performs data communication with the third communication unit, and
a control unit that controls an alternative communication unit that implements a communication function of the mobile terminal that communicates with the base station on the mobile communications network; and
the alternative communication unit controlled by the control unit comprises:
a first data processing unit that causes the third communication unit to detect the base station on a communications network of the communication apparatus, to receive data from the detected base station, and to transfer the received data to the fourth communication unit; and
a second data processing unit that when the data received from the mobile terminal by the fourth communication unit is transferred to the third communication unit, causes the third communication unit to detect the base station on the communication network of the communication apparatus and to transmit the transferred data to the detected base station.

* * * * *

UNITED STATES PATENT AND TRADEMARK OFFICE
CERTIFICATE OF CORRECTION

Page 1 of 1

PATENT NO. : 8,649,325 B2
APPLICATION NO. : 13/137217
DATED : February 11, 2014
INVENTOR(S) : Thach It is certified that error appears in the above-identified patent and that said Letters Patent is hereby corrected as shown below:

In the Claims

Column 26, Line 40 (Approx.), In Claim 1, after "determines that" delete "that".

Signed and Sealed this
Twenty-seventh Day of May, 2014

Michelle K. Lee
*Deputy Director of the United States Patent and Trademark Office*